US012809766B2

(12) United States Patent
Zhou et al.

(10) Patent No.: US 12,809,766 B2
(45) Date of Patent: Nov. 24, 2026

(54) MEMORY SYSTEMS AND METHODS OF OPERATING THEREOF, AND COMPUTER READABLE STORAGE MEDIUMS TO DETERMINE RETENTION DURATION BASED ON THRESHOLD VOLTAGE OF MEMORY CELLS

(71) Applicant: Yangtze Memory Technologies Co., Ltd., Wuhan (CN)

(72) Inventors: Teng Zhou, Wuhan (CN); Weilin Liu, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/916,192

(22) Filed: Oct. 15, 2024

(65) Prior Publication Data

US 2025/0370923 A1 Dec. 4, 2025

(30) Foreign Application Priority Data

Jun. 3, 2024 (CN) ......................... 202410711826.2

(51) Int. Cl.
*G06F 12/00* (2006.01)
*G06F 12/02* (2006.01)

(52) U.S. Cl.
CPC ................................ *G06F 12/0246* (2013.01)

(58) Field of Classification Search
CPC ............... G06F 12/0246; G06F 3/0619; G06F 3/0679; G06F 11/1072; G11C 29/50004
USPC .......................................................... 711/103
See application file for complete search history.

(56) References Cited

U.S. PATENT DOCUMENTS

2010/0199020 A1* 8/2010 Lin ..................... G06F 12/0246 711/E12.001
2016/0049209 A1* 2/2016 Pandey ............. G11C 13/0004 714/721
2021/0216469 A1* 7/2021 Park ........................ G06F 3/061
2022/0066651 A1* 3/2022 Miller .................. G11C 16/105

* cited by examiner

*Primary Examiner* — Mardochee Chery
(74) *Attorney, Agent, or Firm* — Hanley, Flight & Zimmerman, LLC

(57) ABSTRACT

Examples of the present disclosure provide a memory system and an operation method thereof, and a computer readable storage medium. The memory system includes a memory and a controller coupled to the memory, and the memory includes a plurality of memory blocks. The operation method includes: writing dummy data to a selected memory block after external power off and before the memory system being powered off; and reading the dummy data in the selected memory block when the memory system is powered on again after being powered off, and determining an equivalent power-off duration of the memory system according to a read result and a preset mapping table.

20 Claims, 21 Drawing Sheets

Equivalent power-off duration = Equivalent retention duration of a selected memory block - initial time stamp recorded prior to being powered off

<table>
<tr><th>Program-Erase count / Read voltage offset range</th><th>[0，P1）</th><th>[P1，P2）</th><th>[P2，P3）</th></tr>
<tr><td>[0，|U0|）</td><td>M6</td><td>M2</td><td>M1</td></tr>
<tr><td>[|U0|，|U1|）</td><td>M10</td><td>M3</td><td>M2</td></tr>
<tr><td>[|U1|，|U2|）</td><td>M11</td><td>M6</td><td>M4</td></tr>
<tr><td>[|U2|，|U3|）</td><td>M12</td><td>M10</td><td>M5</td></tr>
<tr><td>[|U3|，|U4|）</td><td>M13</td><td>M12</td><td>M7</td></tr>
<tr><td>[|U4|，|U5|）</td><td>M14</td><td>M13</td><td>M10</td></tr>
<tr><td>[|U5|，|U6|）</td><td>M15</td><td>M14</td><td>M12</td></tr>
<tr><td>[|U6|，|U7|）</td><td>M16</td><td>M15</td><td>M13</td></tr>
<tr><td>[|U7|，|U8|）</td><td>M17</td><td>M16</td><td>M15</td></tr>
<tr><td>[|U8|，|U9|）</td><td>M18</td><td>M17</td><td>M16</td></tr>
<tr><td>[|U9|，|U10|）</td><td>M19</td><td>M18</td><td>M17</td></tr>
</table>

FIG. 15

（a）Program-Erase count in the range of [0，P1）

| 序号 | Lower limit of a preset number range | Upper limit of a preset number range | Equivalent retention duration |
|---|---|---|---|
| 0 | ~ | C8 | M14 |
| 1 | C8 | C9 | M13 |
| 2 | C9 | C14 | M11 |
| 3 | C14 | C15 | M10 |
| 4 | C15 | ~ | M6 |

（b）Program-Erase countin the range of [P1，P2）

| 序号 | Lower limit of a preset number range | Upper limit of a preset number range | Equivalent retention duration |
|---|---|---|---|
| 0 | ~ | C2 | M16 |
| 1 | C2 | C4 | M13 |
| 2 | C4 | C7 | M11 |
| 3 | C7 | C10 | M8 |
| 4 | C10 | C12 | M6 |
| 5 | C12 | ~ | M2 |

（c）Program-Erase count in the range of [P2，P3）

| 序号 | Lower limit of a preset number range | Upper limit of a preset number range | Equivalent retention duration |
|---|---|---|---|
| 0 | ~ | C1 | M16 |
| 1 | C1 | C3 | M13 |
| 2 | C3 | C5 | M12 |
| 3 | C5 | C6 | M11 |
| 4 | C6 | C11 | M9 |
| 5 | C11 | C13 | M2 |
| 6 | C13 | ~ | M1 |

FIG. 16

| Erase range interval \ Equivalent retention duration range | <t1 | [t1, t2) | [t2, t3) | [t3, t4) |
|---|---|---|---|---|
| <PE_1 | rr_0 | rr_1 | rr_2 | rr_3 |
| **[PE_1, PE_2)** | **rr_6** | **rr_7** | **rr_8** | **rr_9** |
| [PE_2, PE_3) | rr_12 | rr_13 | rr_14 | rr_15 |
| ≥PE_3 | rr_18 | rr_19 | rr_20 | rr_21 |
| | Block_A<br>Block_B | Block_C<br>Block_D<br>Block_E | Block_F | Block_G<br>Block_H |

| Erase range interval \ Equivalent retention duration range | <t1 | [t1, t2) | [t2, t3) | [t3, t4) |
|---|---|---|---|---|
| <PE_1 | rr_0 | rr_1 | rr_2 | rr_3 |
| **[PE_1, PE_2)** | **rr_6** | **rr_7** | **rr_8** | **rr_9** |
| [PE_2, PE_3) | rr_12 | rr_13 | rr_14 | rr_15 |
| ≥PE_3 | rr_18 | rr_19 | rr_20 | rr_21 |
| | | Block_A<br>Block_B | Block_C<br>Block_D<br>Block_E | Block_F<br>Block_G<br>Block_H |

FIG. 17

MEMORY SYSTEMS AND METHODS OF OPERATING THEREOF, AND COMPUTER READABLE STORAGE MEDIUMS TO DETERMINE RETENTION DURATION BASED ON THRESHOLD VOLTAGE OF MEMORY CELLS

CROSS-REFERENCE TO RELATED APPLICATION

This application claims priority to and the benefit of Chinese Patent Application 202410711826.2, filed on Jun. 3, 2024, which is hereby incorporated by reference in its entirety.

TECHNICAL FIELD

Examples of the present disclosure relate to the field of semiconductor technology, and particularly to memory systems and methods of operating thereof, and a computer readable storage mediums.

BACKGROUND

In recent years, nonvolatile memories are widely applied in various electronic devices, such as personal computers, laptops, smartphones, and tablet computers. A non-volatile memory (e.g., a three-dimensional NAND memory) comprises a memory cell array comprising a plurality of memory cells.

BRIEF DESCRIPTION OF THE DRAWINGS

FIG. 15 illustrates a second preset mapping table between a read voltage offset value and an equivalent retention duration in case of different erase range intervals provided by a fourth example of the present disclosure;

FIG. 16 illustrates a first preset mapping table between a randomized distribution range and an equivalent retention duration in case of different erase range intervals provided by a fifth example of the present disclosure; and FIG. 17 is a schematic diagram of updating an initial time stamp of a memory block provided by examples of the present disclosure.

DETAILED DESCRIPTION

Figure 1:
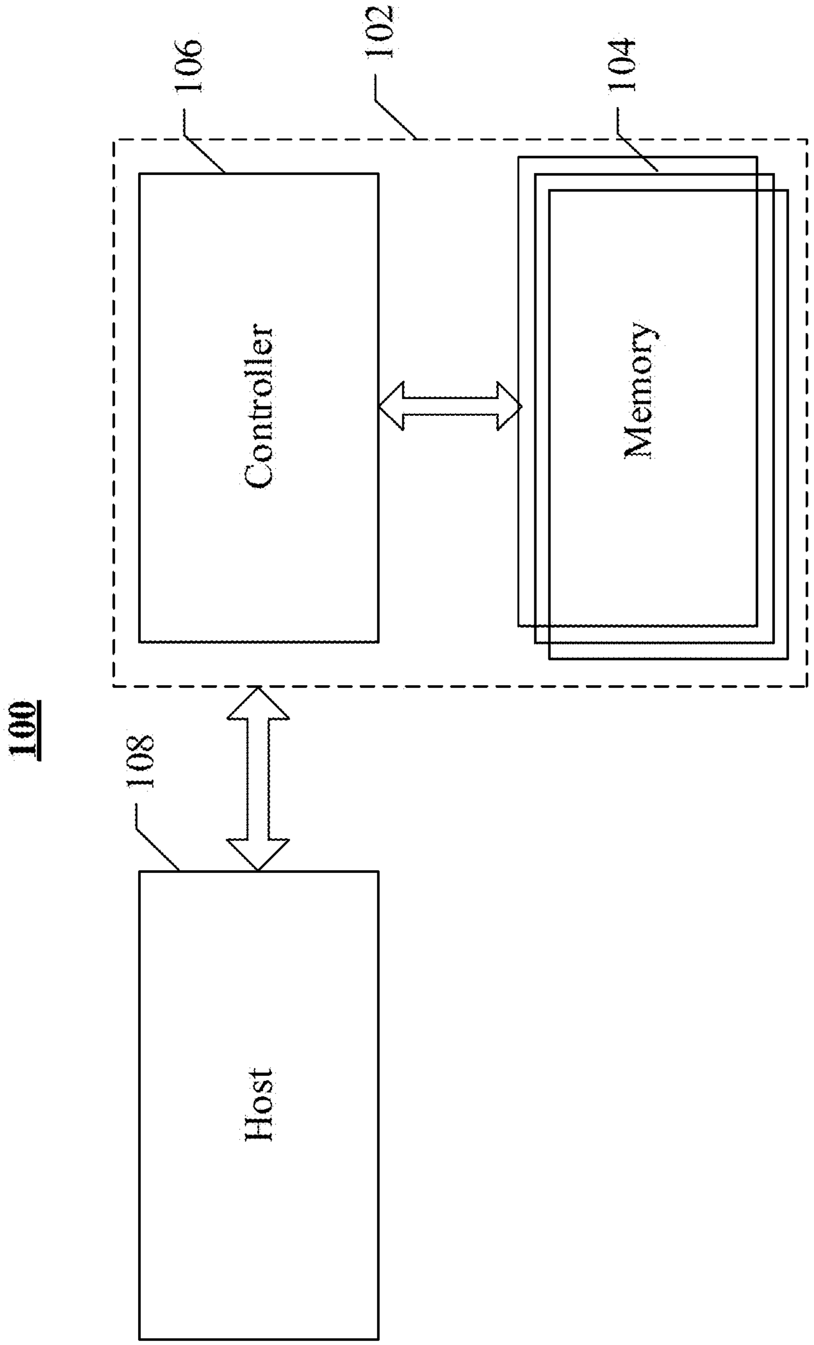
FIG. 1 is a block diagram illustrating a system having a memory according to examples of the present disclosure.

The technical solutions in implementations of the present disclosure will be described below clearly and completely in conjunction with the implementations and drawings of the present disclosure. Apparently, the described implementations are merely part, but not all, of the implementations of the present disclosure. All other implementations obtained by those of ordinary skills in the art based on the implementations in the present disclosure without creative work shall fall within the scope of protection of the present disclosure.

In the description below, many particular details are presented to provide a more thorough understanding of the present disclosure. However, it is obvious to a person skilled in the art that the present disclosure may be implemented without one or more of these details. In other examples, in order to avoid confusing with the present disclosure, some technical features well-known in the art are not described; that is, not all features of actual examples are described herein, and well-known functions and structures are not described in detail.

In the drawings, dimensions and relative dimensions of layers, areas, and elements may be exaggerated for clarity. Like reference numerals denote like elements throughout.

It is to be understood that when an element or a layer is referred to as being "on", "adjacent to", "connected to", or "coupled to" other elements or layers, it may be directly on, adjacent to, connected to, or coupled to the other elements or layers, or one or more intervening elements or layers may be present. In contrast, when an element is referred to as being "directly on", "immediately adjacent to", "directly connected to", or "directly coupled to" other elements or layers, no intervening elements or layers are present. It is to be understood that, although the terms first, second, third, etc. may be used to describe various elements, components, areas, layers, and/or portions, these elements, components, areas, layers, and/or portions should not be limited by these terms. These terms are only used to distinguish one element, component, area, layer or portion from another element, component, area, layer or portion. Thus, a first element, component, area, layer or portion discussed below may be denoted as a second element, component, area, layer or portion, without departing from the teachings of the present disclosure. When the second element, component, region, layer or portion is discussed, it does not mean that the first element, component, region, layer or portion is necessarily present in the present disclosure.

The spatially relative terms, such as “beneath”, “below”, “lower”, “under”, “above”, and “upper”, may be used herein for ease of description to describe a relationship of one element or feature with respect to another element or feature as illustrated in the figure. It is to be understood that the spatially relative terms are intended to further encompass different orientations of a device in use or operation in addition to the orientation depicted in the figure. For example, if a device in the figure is turned over, then an element or a feature described as being “below”, “under”, or “beneath” another element or feature will be orientated as being “above” another element or feature. Thus, the example terms “below” and “under” each may comprise both upper and lower orientations. The device may be orientated otherwise (rotated by 90 degrees or in other orientations), and the spatially descriptive terms used herein are interpreted accordingly.

The terms used herein are only intended to describe the particular examples, and are not used as limitations of the present disclosure. As used herein, unless otherwise indicated expressly in the context, “a”, “an” and “the” in a singular form are also intended to comprise a plural form. It is also to be understood that terms “composed of” and/or “comprise”, when used in this specification, determine the presence of described features, integers, steps, operations, elements and/or components, but do not preclude the presence or addition of one or more of other features, integers, steps, operations, elements, components, and/or groups. As used herein, the term “and/or” comprises any and all combinations of related items listed.

In order to understand the present disclosure thoroughly, detailed operations and detailed structures will be proposed in the following description to set forth the technical solution of the present disclosure. Detailed descriptions of preferable examples of the present disclosure are as follows. However, the present disclosure may also have other implementations in addition to these detailed descriptions.

For case of understanding, the memory in the examples of the present disclosure is illustrated using a three-dimensional NAND flash memory as an example.

Currently, there is an urgent need to improve a memory system and a method of operating thereof.

Referring to FIG. 1, FIG. 1 is a block diagram illustrating a system having a memory according to examples of the present disclosure. As shown in FIG. 1, the system 100 may be a mobile phone, a desktop computer, a laptop computer, a tablet computer, a vehicle computer, a gaming console, a printer, a positioning apparatus, a wearable electronic apparatus, a smart sensor, a Virtual Reality (VR) apparatus, an Augmented Reality (AR) apparatus, or any other suitable electronic apparatuses having memories therein.

As shown in FIG. 1, the system 100 may comprise a host 108 and a memory system 102 (as illustrated by the dashed line box in FIG. 1), and the memory system 102 has one or more memories 104 and a controller 106. The host 108 may be a processor of an electronic apparatus (e.g., a Central Processing Unit (CPU)) or a System on Chip (SoC) (such as an Application Processor (AP)). The host 108 may be configured to send or receive data to or from the memory 104.

In some examples, the controller 106 is coupled to the memory 104 and the host 108, and configured to control the memory 104. The controller 106 can manage data stored in the memory 104 and communicate with the host 108.

In some examples, the controller 106 is designed for operating in a low duty-cycle environment, such as a Secure Digital (SD) card, a Compact Flash (CF) card, a Universal Serial Bus (USB) flash drive, or other media for use in electronic apparatuses, such as a personal computer, a digital camera, and a mobile phone.

In some examples, the controller 106 is designed for operating in a high duty-cycle environment, such as a Solid State Drive (SSD) or an embedded Multi-Media Card (eMMC) which is used as a data memory for a mobile apparatus, such as a smartphone, a tablet computer, and a laptop computer, and an enterprise memory array.

The controller 106 may be configured to control operations of the memory 104, such as read, erase, and programming operations. The controller 106 may be further configured to manage various functions with respect to data stored or to be stored in the memory 104, including but not limited to, bad block management, garbage collection, logical-to-physical address conversion, and wear leveling, etc. In some other examples, the controller 106 is further configured to process an Error Correcting Code (ECC) with respect to data read from or written to the memory 104.

The controller 106 may also perform any other suitable functions, e.g., formatting the memory 104. The controller 106 may communicate with an external apparatus (e.g., the host 108) according to a particular communication protocol. For example, the controller 106 may communicate with the external apparatus through at least one of various interface protocols, such as a USB protocol, an MMC protocol, a Peripheral Component Interconnection (PCI) protocol, a PCI Express (PCI-E) protocol, an Advanced Technology Attachment (ATA) protocol, a Serial ATA protocol, a Parallel ATA protocol, a Small Computer System Interface (SCSI) protocol, an Enhanced Small Drive Interface (ESDI) protocol, an Integrated Drive Electronics (IDE) protocol, and a Firewire protocol, etc.

The controller 106 and one or more memories 104 may be integrated into various types of storage devices, e.g., be included in the same package (such as a Universal Flash Storage (UFS) package or an eMMC package). That is, the memory system 102 can be implemented and packaged into different types of end electronic products.

Figure 2A:
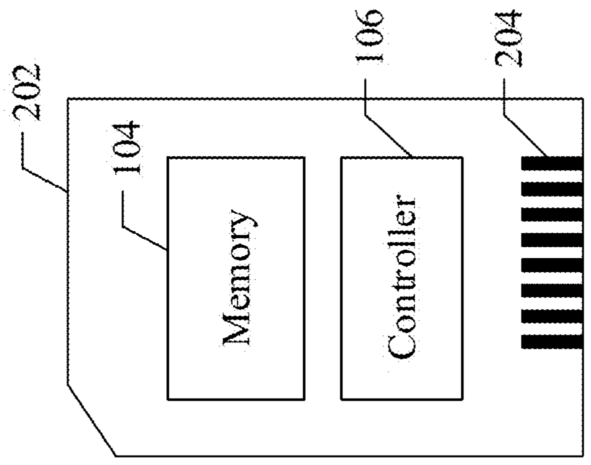
FIG. 2A is a schematic diagram illustrating a memory card having a memory according to examples of the present disclosure.

Referring to FIG. 2A, FIG. 2A is a schematic diagram illustrating a memory card having a memory according to examples of the present disclosure. As shown in FIG. 2A, the controller 106 and the single memory 104 may be integrated into a memory card 202. The memory card 202 may include a Personal Computer Memory Card International Association (PCMCIA) card, a CF card, a Smart Media (SM) card, a memory stick, a Multi-Media Card (such as MMC, Reduced-Size MMC (RS-MMC), and microMMC), an SD (such as SD, miniSD, microSD, Secure Digital High Capacity (SDHC)) card, and a UFS, etc. The memory card 202 may further comprise a memory card connector 204 coupling the memory card 202 with a host (e.g., the host 108 in FIG. 1).

Figure 2B:
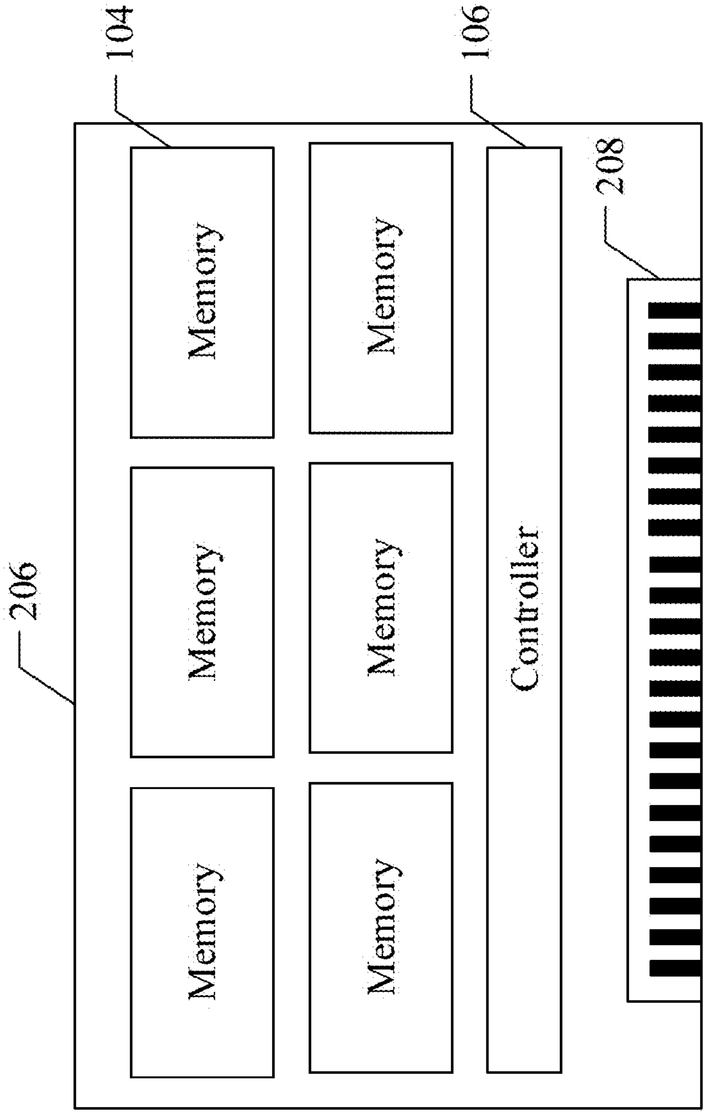
FIG. 2B is a schematic diagram illustrating a solid state drive having a memory according to examples of the present disclosure.

Referring to FIG. 2B, FIG. 2B is a schematic diagram illustrating a solid state drive having a memory according to examples of the present disclosure. As shown in FIG. 2B, the controller 106 and the plurality of memories 104 may be integrated into the solid state drive 206. The solid state drive 206 may further comprise a solid state drive connector 208 coupling the solid state drive 206 with the host (e.g., the host 108 in FIG. 1). In some examples, the storage capacity and/or operation speed of the solid state drive 206 are greater than those of the memory card 202.

Figure 3:
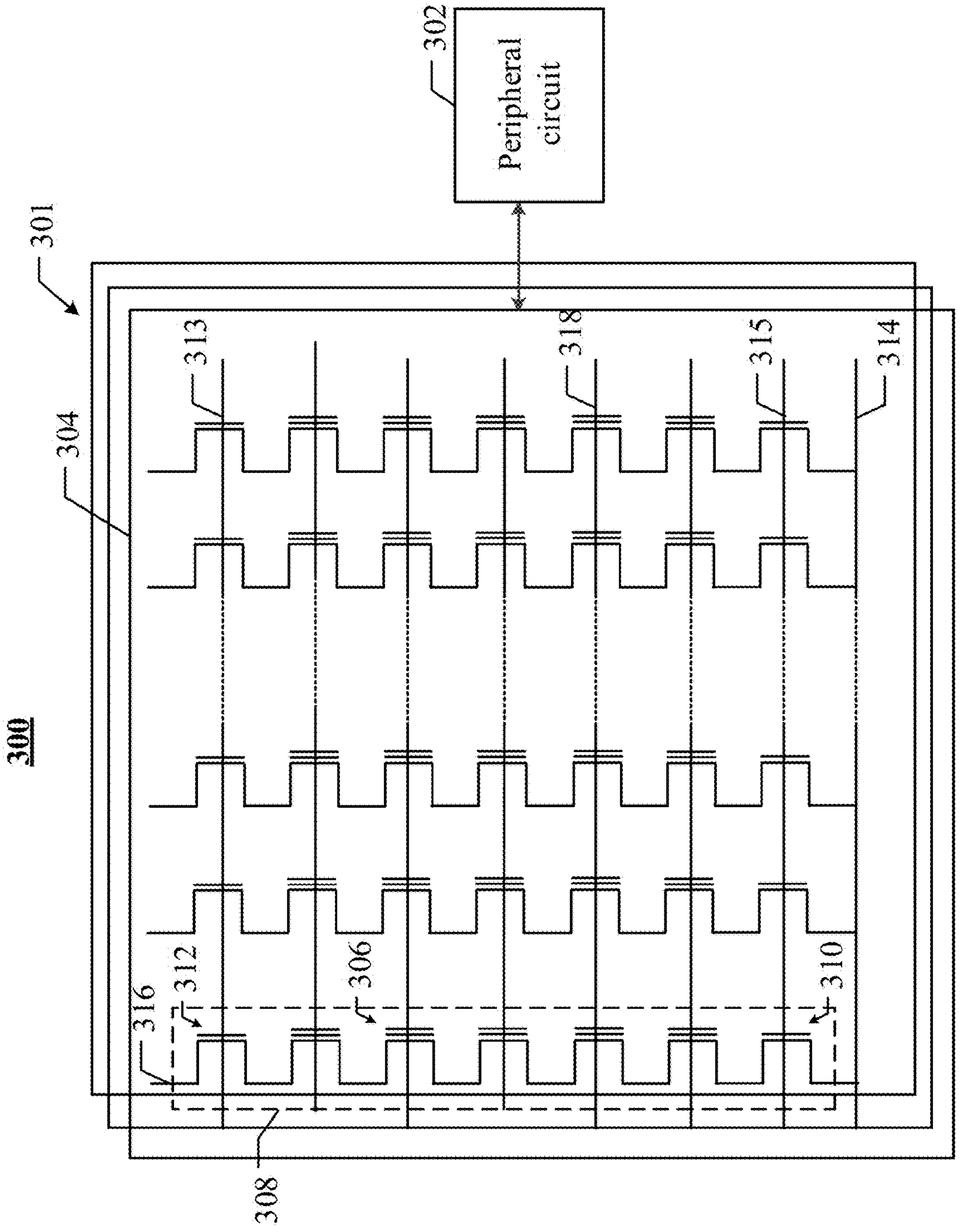
FIG. 3 is a schematic diagram illustrating a memory comprising a peripheral circuit according to examples of the present disclosure.

Referring to FIG. 3, FIG. 3 is a schematic diagram illustrating a memory comprising a peripheral circuit according to examples of the present disclosure. The memory 300 may be an example of the memory 104 in FIG. 1. The memory 300 may comprise a memory cell array 301 and a peripheral circuit 302 coupled to the memory cell array 301. The memory cell array 301 may be a NAND flash memory cell array, wherein memory cells 306 are provided in the form of an array of strings 308, and each string 308 extends vertically above a substrate (not shown in FIG. 3). In some examples, each string 308 comprises a plurality of memory cells 306 coupled in series and stacked vertically. Each memory cell 306 may maintain a continuous analog value, such as a voltage or charge, which depends on the number of electrons trapped within a region of the memory cell 306. Each memory cell 306 may be a floating gate memory cell that comprises a floating gate transistor, or a charge trap memory cell that comprises a charge trap transistor.

In some examples, each memory cell 306 may be a Single-Level Cell (SLC) that has two possible memory states and thus can store one bit of data. For example, the SLC may have a first memory state "1" and a second memory state "0". Herein, a threshold voltage distribution of the first memory state "1" may correspond to a first voltage range, and a threshold voltage distribution of the second memory state "0" may correspond to a second voltage range. The first memory state is an erase state, and the second memory state is a program state. In some examples, each memory cell 306 is a Multi-Level Cell (MLC) that is capable of storing more than a single bit of data in more than four memory states. For example, the MLC may store two bits of data per cell, three bits of data per cell (also referred to as a Triple-Level Cell (TLC)), or four bits of data per cell (also referred to as a Quad-Level Cell (QLC)). Each MLC may be programmed to assume a voltage range of a possible threshold voltage distribution. In one example, if each MLC stores two bits of data, the MLC may have a first memory state "11", a second memory state "10", a third memory state "01", and a fourth memory state "00". Herein, threshold voltage distributions of the first, second, third, and fourth memory states correspond to first, second, third, and fourth voltage ranges, respectively. The first memory state is an erase state, and the second, third, and fourth memory state are program states. Similarly, The TLC may have 8 memory states comprising one erase state and 7 program states; the QLC may have 16 memory states comprising one erase state and 15 program states.

As shown in FIG. 3, each string 308 may comprise a Source Selective Transistor (SST) 310 at a source terminal thereof and a Drain Selective Transistor (DST) 312 at a drain terminal thereof. The source selective transistor 310 and the drain selective transistor 312 may be configured to activate a selected string 308 (a column of the array) during read and programming operations. In some examples, sources of the strings 308 in the same memory block 304 are coupled through the same source line (SL) 314 (e.g., a common SL). In other words, all the strings 308 in the same memory block have an Array Common Source (ACS). In some examples, a drain of the drain selective transistor 312 of each string 308 is coupled to a respective Bit Line (BL) 316, wherein data can be read from or written to the bit line 316 via an output bus (not shown in FIG. 3). In some examples, each string 308 is configured to be selected or deselected by applying a select voltage (e.g., above a threshold voltage of the drain selective transistor 312) or a deselect voltage (e.g., 0 V) to the respective drain selective gate 312 via one or more Drain Selective Lines (DSLs) 313 and/or by applying a select voltage (e.g., above a threshold voltage of the source selective transistor 310) or a deselect voltage (e.g., 0 V) to the respective source selective gate 310 via one or more Source Selective Lines (SSLs) 315.

As shown in FIG. 3, the strings 308 may be organized into a plurality of memory blocks 304, and each of the plurality of memory blocks 304 may have a source line 314 (e.g., the common SL coupled to the ground). In some examples, each memory block 304 is a basic data unit for performing an erase operation, e.g., all the memory cells 306 on the same memory block 304 are erased at the same time. In order to erase the memory cells 306 in a selected memory block, the source line 314 coupled to the selected memory block and an unselected memory block that is in the same plane as the selected memory block may be biased with an erase voltage Vers (such as a high positive voltage (e.g., 20 V or higher)). It is to be understood that in some examples, the erase operation may be performed at a half memory block level, a quarter memory block level, or a level having any suitable number of memory blocks or any suitable fractions of a memory block. The memory cells 306 of adjacent ones of the strings 308 may be coupled through a Word Line (WL) 318, wherein the word line 318 selects which row of memory cells 306 to be affected by the reading and programming operations. In some examples, the memory cells 306 in the same memory block 304 that are coupled to the same word line 318 may constitute at least one page. Each word line 318 may comprise a plurality of control gates (gate electrodes) at each memory cell 306 in the respective page, and a gate line coupled with the control gates.

It is to be noted that the page mentioned above may be considered as a Physical Page, which refers to a layer of memory cells on a physical layer. For the SLC, each memory cell can store one bit of information, so that information stored in one layer of memory cells (e.g., one physical page) on the physical layer corresponds to information in one logic page. For the MLC, each memory cell can store two bits of information, so that information stored in one layer of memory cells (e.g., one physical page) on the physical layer corresponds to information in two logic pages. For the TLC, each memory cell can store three bits of information, so that information stored in one layer of memory cells (e.g., one physical page) on the physical layer corresponds to information in three logic pages. For the QLC, each memory cell can store four bits of information, so that information stored in one layer of memory cells (e.g., one physical page) on the physical layer corresponds to information in four logic pages.

Figure 4:
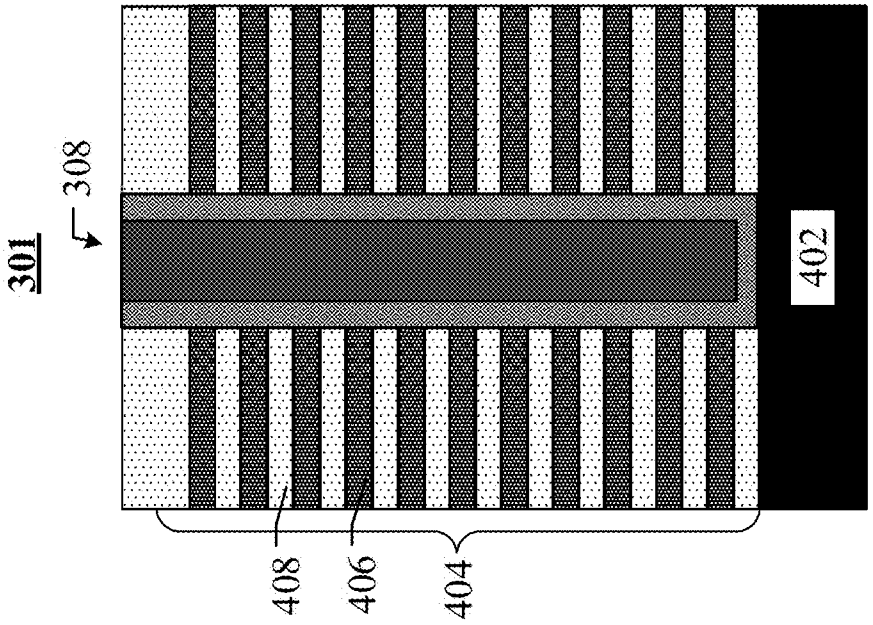
FIG. 4 is a schematic cross-sectional view illustrating a memory cell array comprising a memory string according to examples of the present disclosure.

Referring to FIG. 4, FIG. 4 is a schematic cross-sectional view illustrating a memory cell array comprising a string according to examples of the present disclosure. As shown in FIG. 4, the string 308 may extend vertically above a substrate 402 and penetrate through a memory stack layer 404. The substrate 402 may include silicon (e.g., monocrystalline silicon), silicon germanium (SiGe), gallium arsenide (GaAs), germanium (Ge), Silicon-on-Insulator (SOI), Germanium-on-Insulator (GOI), or any other suitable materials.

The memory stack layer 404 may comprise alternating gate conductive layers 406 and gate dielectric layers 408. The number of pairs of the gate conductive layers 406 and the gate dielectric layers 408 in the memory stack layer 404 may determine the number of the memory cells 306 in the memory cell array 301. Each gate conductive layer 406 may include a conductive material, including, but not limited to, tungsten (W), cobalt (Co), copper (Cu), aluminum (Al), polycrystalline silicon, doped silicon, silicide, or any combination thereof. In some examples, each gate conductive layer 406 includes a metal layer, e.g., a tungsten layer. In some examples, each gate conductive layer 406 includes a doped polysilicon layer. Each gate conductive layer 406 may comprise a control gate surrounding the memory cell 306, and may extend laterally at the top of the memory stack layer 404 as the drain selective line 313, may extend laterally at the bottom of the memory stack layer 404 as the source selective line 315, or may extend laterally between the drain selective line 313 and the source selective line 315 as the word line 318.

As shown in FIG. 4, the string 308 comprises a channel structure vertically extending through the memory stack layer 404. In some examples, the channel structure comprises a channel hole filled with (one or more) semiconductor materials (e.g., as a semiconductor channel) and (one or more) dielectric materials (e.g., as a memory film). In some examples, the semiconductor channel includes silicon, e.g., polysilicon. In some examples, the memory film is a composite dielectric layer comprising a tunneling layer, a storage layer (also referred to as a "charge trap/storage layer"), and a barrier layer. The channel structure may have a cylindrical shape (e.g., a pillar shape). According to some examples, the semiconductor channel, the tunneling layer, the storage layer, and the barrier layer are arranged radially from the center toward the outer surface of the pillar in this order. The tunneling layer may include silicon oxide, silicon oxynitride, or any combination thereof. The storage layer may include silicon nitride, silicon oxynitride, or any combination thereof. The barrier layer may include silicon oxide, silicon oxynitride, a high dielectric constant (high-k) dielectric, or any combination thereof. In an example, the memory film may comprise a composite layer of silicon oxide/silicon oxynitride/silicon oxide (ONO).

According to some examples, a well (e.g., at least one of a P well or an N well) is formed in the substrate 402, and a source terminal of the string 308 is in contact with the well. For example, the source line may be coupled to the well to apply an erase voltage to the well (e.g., the source of the string) during the erase operation. In some examples, the string 308 further comprises a channel plug at the drain terminal of the string 308. It is to be understood that, although not shown in FIG. 4, additional components of the memory cell array 301 may be formed, including, but not limited to, a gate line slit/source contact, a local contact, and an interconnect layer, etc.

Referring back to FIG. 3, the peripheral circuit 302 may be coupled to the memory cell array 301 through the bit line 316, the word line 318, the source line 314, the source selective line 315, and the drain selective line 313. The peripheral circuit 302 may include any suitable analog, digital, and hybrid signal circuits for facilitating operations of the memory cell array 301 by applying and sensing at least one of a voltage signal or a current signal to and from each target memory cell via the bit line 316, the word line 318, the source line 314, the source selective line 315, and the drain selective line 313. The peripheral circuit 302 may include various types of peripheral circuits formed using a metal oxide semiconductor (MOS) technology.

Figure 5:
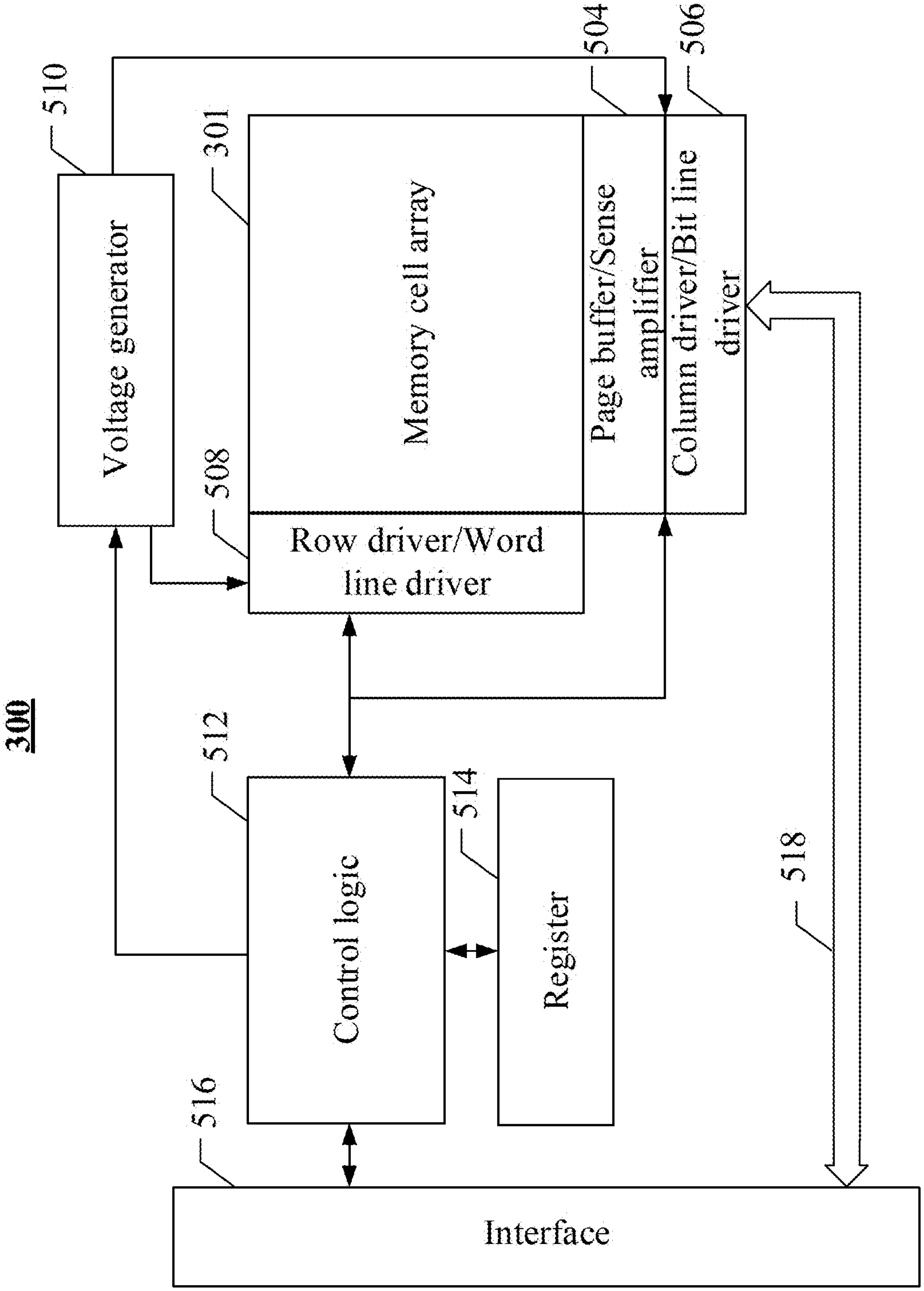
FIG. 5 is a block diagram illustrating a memory comprising a peripheral circuit according to examples of the present disclosure.

Referring to FIG. 5, FIG. 5 is a block diagram illustrating a memory comprising a peripheral circuit according to examples of the present disclosure. As shown in FIG. 5, peripheral circuits comprise a page buffer/sense amplifier 504, a column driver/bit line driver 506, a row driver/word line driver 508, a voltage generator 510, a control logic 512, a register 514, an interface (I/F) 516, and a data bus 518. It is to be understood that in some examples, additional peripheral circuits not shown in FIG. 5 may be included as well.

The page buffer/sense amplifier 504 may be configured to read and program (write) data from and to the memory cell array 301 according to control signals from the control logic 512. In another example, the page buffer/sense amplifier 504 may perform a program verification operation to ensure that data has been properly programmed into the memory cell 306 coupled to the selected word line 318. In still another example, the page buffer/sense amplifier 504 may also sense a low power signal from the bit line 316 that represents a data bit stored in the memory cell 306, and amplify a small voltage swing to a recognizable logic level during the read operation. The column driver/bit line driver 506 may be configured to be controlled by the control logic 512 and select one or more strings 308 by applying a bit line voltage generated from the voltage generator 510.

The row driver/word line driver 508 may be configured to be controlled by the control logic 512, select/unselect the memory block of the memory cell array 301, and select/unselect the word line 318 of the memory block. The row driver/word line driver 508 may be further configured to drive the word line 318 using a word line voltage generated from the voltage generator 510. In some examples, the row driver/word line driver 508 may also select/unselect and drive the source selective line 315 and the drain selective line 313. As described below in detail, the row driver/word line driver 508 is configured to perform the erase operation on the memory cells 306 coupled to (one or more) selected word lines 318. The voltage generator 510 may be configured to be controlled by the control logic 512, and generate the word line voltage (such as a read voltage, a program voltage, a pass voltage, a local voltage, and a verify voltage), the bit line voltage, and a source line voltage that are to be supplied to the memory cell array 301.

The control logic 512 may be coupled to each peripheral circuit described above and configured to control operations of each peripheral circuit. The register 514 may be coupled to the control logic 512 and include a state register, a command register, and an address register for storing state information, a command operation code (OP code), and a command address for controlling the operations of each peripheral circuit. The interface 516 may be coupled to the control logic 512, and act as a control buffer to buffer and relay a control command received from the host (not shown in FIG. 5) to the control logic 512 and buffer and relay state information received from the control logic 512 to the host. The interface 516 may be also coupled to the column driver/bit line driver 506 via the data bus 518 and act as a data input/output (I/O) interface and a data buffer to buffer and relay data to and from the memory cell array 301.

After a period of idle time following a programming operation performed on the memory cells of the memory, a read operation is performed on the memory cells, wherein at this time, a threshold voltage distribution of the programmed memory cells is offset, failing to satisfy the Quality of Service (QoS) requirement of a subsequent one-shot read pass for the memory (such as an Enhanced Solid State Drive (SSD)). Therefore, before the read operation is performed on the memory, it is required to re-determine a read voltage for performing a subsequent read operation according to state information of the memory cells (e.g., threshold voltage distribution state information of the memory cells). The state information of the memory cells is related to an equivalent retention duration. Typically, the longer the equivalent retention duration for data stored on the memory block (Data Retention), the bigger a threshold voltage of the memory cells is offset. Therefore, it may be considered to determine the equivalent retention duration for the data stored on the memory block according to the threshold voltage distribution state information of the memory cells.

After the power-off of the memory system, an equivalent power-off duration of the memory system cannot be recorded, and after the memory system is powered on again, it is required to determine the equivalent power-off duration of the memory system according to the threshold voltage distribution state information of the memory cells. As such, the equivalent retention duration for the data stored on the memory block could be updated based on the equivalent power-off duration of the memory system; and accordingly, the read voltage for performing the subsequent read operation is re-determined according to the updated equivalent retention duration for the data stored on the memory block.

Before the examples of the present disclosure are introduced, it may need to explain the technical terms such as an initial equivalent retention duration, an equivalent power-off duration, and an equivalent retention duration that are involved in the examples of the present disclosure.

Herein, the equivalent retention duration is determined based on a temperature and a physical retention duration. In case of temperature conditions being the same, the physical retention durations may be compared directly; in case of temperature conditions being different, the physical retention durations cannot be compared directly, and a conversion based on the temperatures and the physical retention durations is required to obtain equivalent retention durations in case of the same temperature, and then the equivalent retention durations can be compared.

Herein, the initial equivalent retention duration (which may also be referred to as an "initial time stamp") refers to an equivalent retention duration for the data stored on the memory block prior to the memory system being powered off, wherein the initial equivalent retention duration is determined based on a temperature and an initial physical retention duration.

Herein, the equivalent power-off duration refers to a duration after the memory system is powered off and before the memory system is powered on again, e.g., an equivalent power-off duration of the memory system during a power-off process, wherein the equivalent power-off duration is determined based on a temperature and a physical power-off duration.

Herein, the equivalent retention duration (which may also be referred to as an "updated time stamp") refers to a sum of the initial equivalent retention duration and the equivalent power-off duration, which comprises both the initial equivalent retention duration, for the data stored on the memory block prior to the memory system being powered off, and the equivalent power-off duration after the memory system is powered off and before the memory system is powered on again, wherein the equivalent retention duration is determined based on the temperature and the physical retention duration.

In some examples, a typical temperature may be selected, and a conversion based on the temperature and the physical retention duration is performed to obtain the equivalent retention duration. For example, 55° C. may be selected as the typical temperature, and physical retention durations under other temperature conditions are all converted into equivalent retention durations under 55° C. The examples of the present disclosure impose no particular limitation on the value of the typical temperature, and a person skilled in the art may select the value flexibly according to an actual situation.

Before the examples of the present disclosure are introduced, it may need to explain memory block-related classification involved in the examples of the present disclosure. The memory blocks may be classified into an open block, a close block, an erase block, an open super block, an erase super block, and an orphan block, etc. Definitions of the open block, the close block, the erase block, the open super block, the erase super block, and the orphan block are explained below.

Herein, the open block (which may also be referred to as a "partially programmed block") refers to a memory block on which a programming operation has been started and that is in an open state with at least one page in the memory block having not yet been programmed. In an example, part of memory cells in the open block have been programmed and the rest of the memory cells have not been programmed.

Herein, the close block (which may also be referred to as a "full block") refers to a memory block with all memory cells having been programmed.

Herein, the erase block refers to a memory block on which an erase operation has been performed and with all memory cells being in an erase state.

Before the definition of the orphan block is introduced, it may need to explain the definition of a Super Block (SPB).

Herein, the memory system comprises the memory and the controller coupled to the memory, and the memory may comprise a plurality of dies, e.g., dies Die_0, Die_1, and Die_2 to Die_N, wherein N is an integer greater than or equal to 1. The examples of the present disclosure impose no particular limitation on the number of the dies included in the memory.

Figure 6:
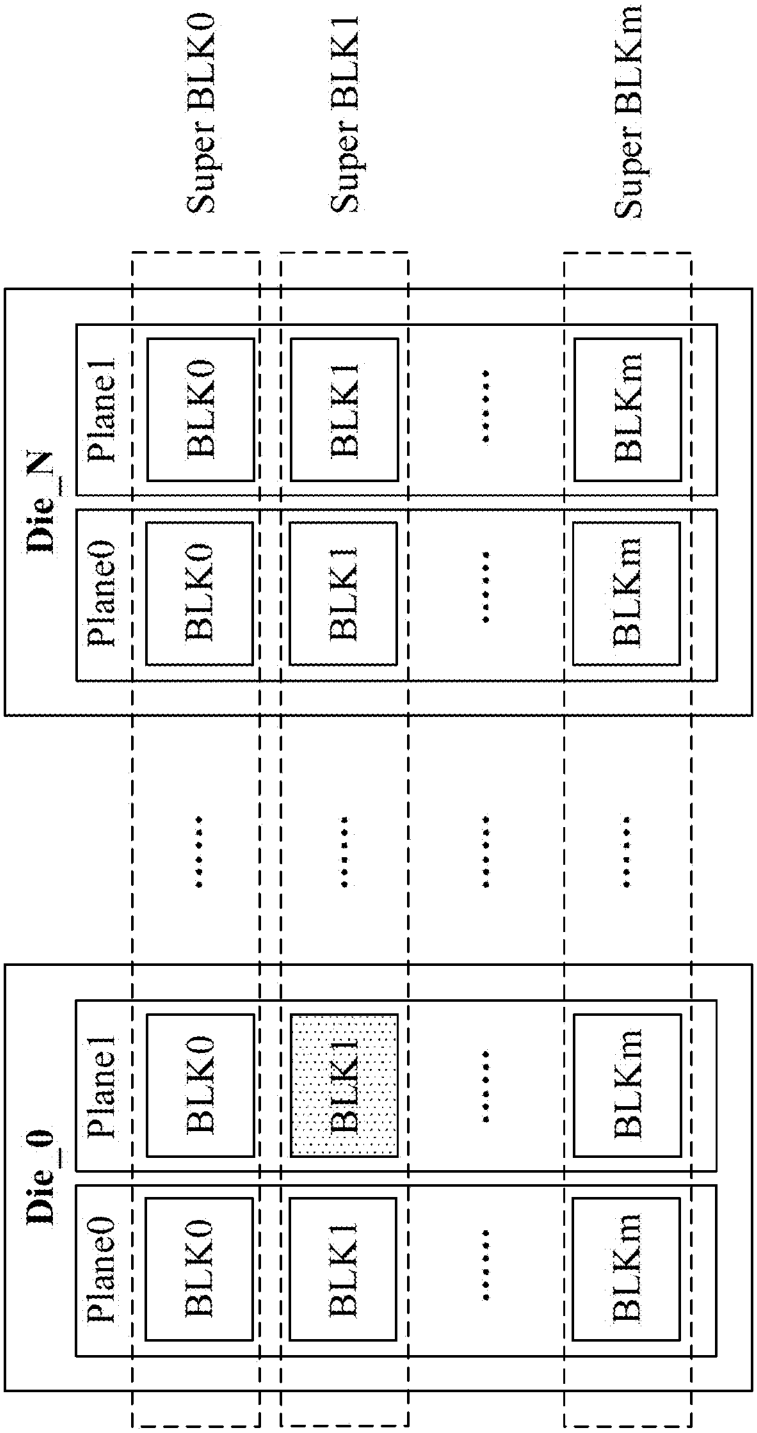
FIG. 6 is a schematic diagram illustrating a super block according to examples of the present disclosure.

Herein, each of the dies Die_0, Die_1, and Die_2 to Die_N may comprise one or more planes. Referring to FIG. 6, FIG. 6 is a schematic diagram illustrating a super block according to examples of the present disclosure. As shown in FIG. 6, each die comprises two planes, Plane0 and Plane1. Each plane may comprise a plurality of memory blocks, e.g., BLK0, BLK1, and BLK2 to BLKm, wherein m is an integer greater than or equal to 1, and each super block may comprise 2N memory blocks. The examples of the present disclosure impose no particular limitation on the number of the planes included in each die or the number of the memory blocks included in each plane.

In an example, the controller may manage the die in super block as a unit. One super block may comprise at least one memory block in at least one die. In an example, one super block may comprise memory blocks with the same sequence number in all planes in all the dies. For example, memory blocks BLK0 included in each of the planes in each of the dies Die_0 to Die_N may collectively constitute a super block Super BLK0; and memory blocks BLK1 included in each of the planes in each of the dies Die_0 to Die_N may collectively constitute a super block Super BLK1. In this way, the dies Die_0, Die_1, and Die_2 to Die_N may comprise the super block Super BLK0, the super block Super BLK1 to a super block Super BLKm.

Herein, the open super block refers to a super block on which a programming operation has been started and that is in an open state, wherein the open super block comprises a plurality of open blocks. Herein, parallel operations may be performed on the plurality of open blocks included in the open super block.

Herein, the erase super block refers to a super block on which an erase operation has been performed and with all memory cells being in an erase state, wherein the erase super block comprises a plurality of erase blocks. Herein, parallel operations are performed on the plurality of memory blocks included in the super block, so as to obtain the erase super block.

Herein, a bad super block refers to a super block incapable of normal use, wherein each memory block included in the bad super block is a bad block; or there are more than a certain number of bad blocks in all memory blocks included in the bad super block. That is, the bad super block may also comprise a good block. In an example, one super block may comprise 8 memory blocks, wherein 6 memory blocks are bad blocks and the other 2 memory blocks are good blocks. In this case, the good block in the bad super block may be referred to as the orphan block.

Before the examples of the present disclosure are introduced, first explain a programming operation and a read operation in the multi-level-cell.

It is to be noted that when the memory system receives a command (CMD) and host data (DATA) sent by the host that are corresponding to the programming operation, the controller in the memory system may randomize the host data (DATA) and store the randomized data in the memory. For example, during the programming operation performed by the memory on the TLC, the controller may randomize the host data (DATA) received from the host, wherein randomized first data, second data, third data, fourth data, fifth data, sixth data, seventh data, and eighth data are 111, 011, 001, 000, 010, 110, 100, and 101, respectively, and the first data to the eighth data have the same number of bits. Correspondingly, during the read operation, it is also required to de-randomize raw data read from the memory, so as to obtain the host data (DATA).

Figure 7:
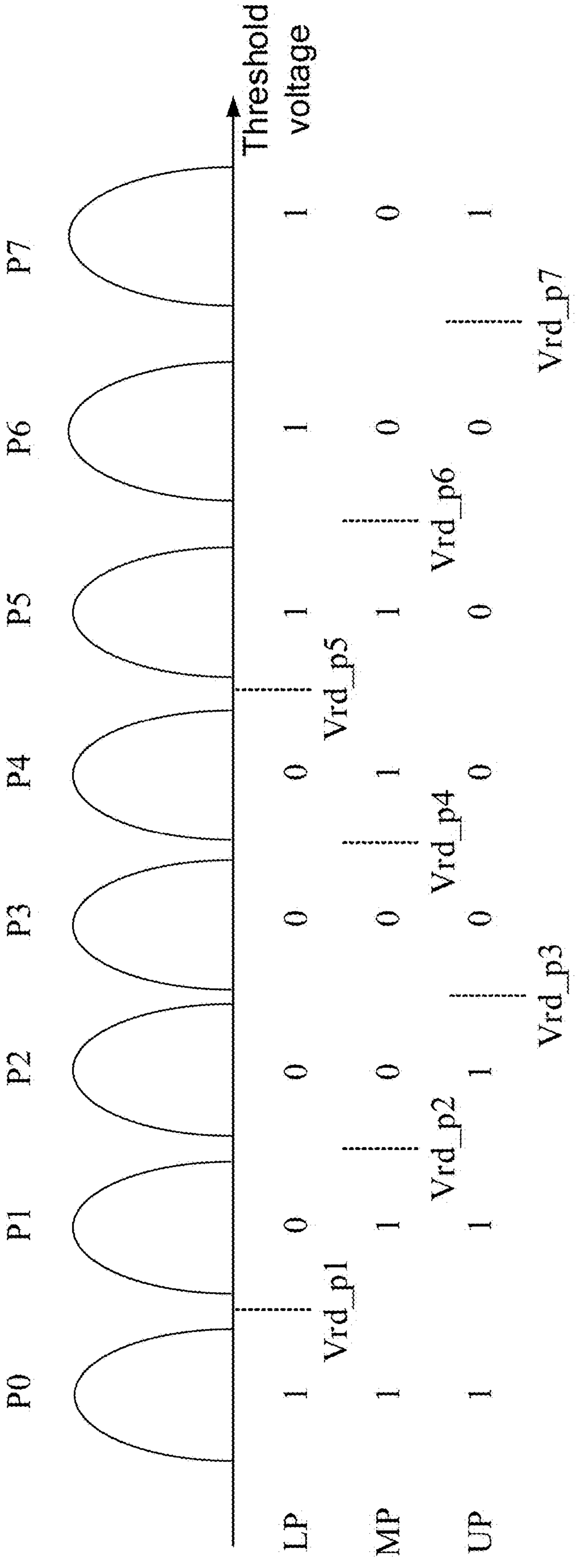
FIG. 7 is a schematic diagram illustrating a read operation performed on a triple-level-cell according to examples of the present disclosure.

Herein, the read operation on the memory cell is explained with an example in which the memory cell is the TLC. The same word line may be coupled to three logical pages of the same row, and the three logical pages may comprise a Low Page (LP), a Middle Page (MP), and an Up Page (UP). Referring to FIG. 7, FIG. 7 is a schematic diagram illustrating a read operation performed on a triple-level-cell according to examples of the present disclosure. As shown in FIG. 7, after the programming operation is performed, each TLC memory cell may store three bits of data and may have a first memory state "111", a second memory state "011", a third memory state "001", a fourth memory state "000", a fifth memory state "010", a sixth memory state "110", a seventh memory state "100", and an eighth memory state "101". Threshold voltage distributions of the first, second, third, fourth, fifth, sixth, seventh, and eighth memory states correspond to first, second, third, fourth, fifth, sixth, seventh, and eighth voltage ranges, respectively. The first memory state is an erase state (e.g., P0), and the second, third, fourth, fifth, sixth, seventh, and eighth memory states are respectively first, second, third, fourth, fifth, sixth, and seventh program states (e.g., P1 to P7).

Herein, for read operations on the LP, the read operations may be performed using a first read voltage Vrd_p1 and a fifth read voltage Vrd_p5; for read operations on the MP, the read operations may be performed using a second read voltage Vrd_p2, a fourth read voltage Vrd_p4, and a sixth read voltage Vrd_p6; and for read operations on the UP, the read operations may be performed using a third read voltage Vrd_p3 and a seventh read voltage Vrd_p7.

Herein, for the read operations on the LP, a read operation with the first read voltage Vrd_p1 and a read operation with the fifth read voltage Vrd_p5 may be performed sequentially.

During the read operation with the first read voltage Vrd_p1, a memory cell having a threshold voltage less than the first read voltage Vrd_p1 is an ON cell, and a memory cell having a threshold voltage greater than the first read voltage Vrd_p1 is an OFF cell. Accordingly, data "1" may be read from the memory cell having a threshold voltage less than the first read voltage Vrd_p1, and data "0" may be read from the memory cell having a threshold voltage greater than the first read voltage Vrd_p1. Since the first read voltage Vrd_p1 is a minimum read voltage in read voltages for recognizing data in the LP, the data "1" read from the memory cell having a threshold voltage less than the first read voltage Vrd_p1 is deterministic data. For example, the data "1" read from the memory cell corresponding to the erase state P0 and having a threshold voltage less than the first read voltage Vrd_p1 is deterministic data.

Since the read operation with the fifth read voltage Vrd_p5 is to be performed to complete the read operations on the LP, the data "0" read from the memory cell having a threshold voltage greater than the first read voltage Vrd_p1 is not deterministic data.

During the read operation with the fifth read voltage Vrd_p5, a grounding voltage may be applied to a bit line corresponding to the memory cell having the deterministic data and in the erase state P0, and a precharge voltage may be applied to the other bit lines.

During the read operation with the fifth read voltage Vrd_p5, data "1" may be read from memory cells having the first program state P1 to the fourth program state P4, and data "0" may be read from memory cells having the fifth program state P5 to the seventh program state P7. According to an algorithm of the read operation on the LP, the data read using the fifth read voltage Vrd_p5 may be flipped and stored in a page buffer. Therefore, data read from the memory cells corresponding to the first program state P1 to the fourth program state P4 and each having a threshold voltage less than the fifth read voltage Vrd_p5 may be determined as "0", and data read from the memory cells corresponding to the fifth program state P5 to the seventh program state P7 and each having a threshold voltage greater than the fifth read voltage Vrd_p5 may be determined as "1".

When the read operations on the LP are finished, read operations on the MP may be performed. Herein, for the read operations on the MP, the read operation with the second read voltage Vrd_p2, the read operation with the fourth read voltage Vrd_p4, and the read operation with the sixth read voltage Vrd_p6 may be performed in sequence.

During the read operation with the second read voltage Vrd_p2, data "1" may be read from a memory cell having a threshold voltage less than the second read voltage Vrd_p2, and data "0" may be read from a memory cell having a threshold voltage greater than the second read voltage Vrd_p2. Since the second read voltage Vrd_p2 is a minimum read voltage in read voltages for recognizing data in the MP, the data "1" read from the memory cell having a threshold voltage less than the second read voltage Vrd_p2 is deterministic data. For example, data "1" read from memory cells corresponding to the erase state P0 and the first program state P1 and each having a threshold voltage less than the second read voltage Vrd_p2 is deterministic data.

Since the read operation with the fourth read voltage Vrd_p4 and the read operation with the sixth read voltage Vrd_p6 are to be performed to complete the read operations on the MP, the data "0" read from the memory cell having a threshold voltage greater than the second read voltage Vrd_p2 is not deterministic data.

During the read operation with the fourth read voltage Vrd_p4, the grounding voltage may be applied to bit lines corresponding to the memory cells having the deterministic data and in the erase state P0 and the first program state P1, and the precharge voltage may be applied to the other bit lines.

During the read operation with the fourth read voltage Vrd_p4, data "1" may be read from memory cells having the second program state P2 and the third program state P3, and data "0" may be read from memory cells having the fourth program state P4 to the seventh program state P7. According to an algorithm of the read operation on the MP, the data read using the fourth read voltage Vrd_p4 may be flipped and stored in a page buffer. Therefore, data read from the memory cells corresponding to the second program state P2 and the third program state P3 and each having a threshold voltage less than the algorithm read voltage Vrd_p4 may be determined as "0".

Since the read operation with the sixth read voltage Vrd_p6 is to be performed to complete the read operations on the MP, the data "1" read from the memory cell having a threshold voltage greater than the fourth read voltage Vrd_p4 is not deterministic data.

During the read operation with the sixth read voltage Vrd_p6, the grounding voltage may be applied to bit lines corresponding to the memory cells having the determined data and in the erase state P0 and the first program state P1 to the third program state P3, and the precharge voltage may be applied to the other bit lines.

During the read operation with the sixth read voltage Vrd_p6, data read from the memory cells corresponding to the fourth program state P4 and the fifth program state P5 and each having a threshold voltage less than the sixth read voltage Vrd_p6 may be determined as "1", and data read from the memory cells corresponding to the sixth program state P6 and the seventh program state P7 and each having a threshold voltage greater than the sixth read voltage Vrd_p6 may be determined as "0".

When the read operations on the MP are finished, read operations on the UP may be performed. Herein, for the read operations on the UP, the read operation with the third Vrd_p3 and the read operation with the seventh read voltage Vrd_p7 may be performed in sequence.

During the read operation with the third read voltage Vrd_p3, data "1" may be read from a memory cell having a threshold voltage less than the third read voltage Vrd_p3, and data "0" may be read from a memory cell having a threshold voltage greater than the third read voltage Vrd_p3. Since the third read voltage Vrd_p3 is a minimum read voltage in read voltages for recognizing data in the UP, the data "1" read from the memory cell having a threshold voltage less than the third read voltage Vrd_p3 is deterministic data. For example, data "1" read from memory cells corresponding to the erase state P0, the first program state P1, and the second program state P2 and each having a threshold voltage less than the third read voltage Vrd_p3 is determined data.

Since the read operation with the seventh read voltage Vrd_p7 is to be performed to complete the read operations on the UP, the data "0" read from the memory cell having a threshold voltage greater than the third read voltage Vrd_p3 is not deterministic data.

During the read operation with the seventh read voltage Vrd_p7, the grounding voltage may be applied to bit lines corresponding to the memory cells having the deterministic data and in the erase state P0, the first program state P1, and the second program state P2, and the precharge voltage may be applied to the other bit lines.

During the read operation with the seventh read voltage Vrd_p7, data "1" may be read from memory cells having the third program state P3 to the sixth program state P6, and data "0" may be read from a memory cell having the seventh program state P7. According to an algorithm of the read operation on the UP, the data read using the seventh read voltage Vrd_p7 may be flipped and stored in a page buffer. Therefore, data read from the memory cells corresponding to the third program state P3 to the sixth program state P6 and each having a threshold voltage less than the seventh read voltage Vrd_p7 may be determined as "0", and data read from the memory cell corresponding to the seventh program state P7 and having a threshold voltage greater than the seventh read voltage Vrd_p7 may be determined as "1".

It is to be noted that since the TLC comprises 8 memory states, a set of read voltages is required to perform the read operations on the TLC, so as to differentiate between the 8 memory states, wherein the set of read voltages comprises 7 read voltages. A read result may be obtained only after all the read voltages in the set of read voltages have been used, wherein the read result refers to specific data stored in a memory cell obtained by reading. In an example, 3-bit data "101" stored in a memory cell may be obtained by reading.

However, in a Single-Level Read (SLR) operation, a read operation is performed using a read voltage in the set of read voltages, and a number of memory cells each having a threshold voltage greater than or equal to the read voltage and a number of memory cells each having a threshold voltage less than the read voltage are obtained as read results. Data of a memory cell having a threshold voltage less than the read voltage may be determined as "1", and data of a memory cell having a threshold voltage greater than or equal to the read voltage may be determined as "0". Of course, "1" and "0" here do not represent the actual data stored in the memory cell, but are only for classification based on a relationship between magnitudes of the read voltage and the threshold voltage of the memory cell, wherein a memory cell having a threshold voltage less than the read voltage is regarded as a first class, and data stored in the first class of memory cells is regarded as "1"; a memory cell having a threshold voltage greater than or equal to the read voltage is regarded as a second class, and data stored in the second class of memory cells is regarded as "0".

The above two read operation differ in the following two aspects. In a first aspect, numbers of read voltages used to perform read operations are different, wherein the read operations on the TLC require the use of all the read voltages in the set of read voltages, whereas the SLR operation requires the use of only one of the read voltages in the set of read voltages. In a second aspect, read results are different, wherein in the read operations on the TLC, specific data stored in a memory cell may be obtained, by reading, as a read result, whereas in the SLR operation, specific data stored in a memory cell cannot be read, and a "1" count number and a "0" count number are the read results, with the count number "0" and "1" being only used for differentiating the comparison result between the threshold voltage of the memory cell and the read voltage.

A process of determining the equivalent power-off duration using a randomized distribution characteristic value is described in detail below.

Figure 8:
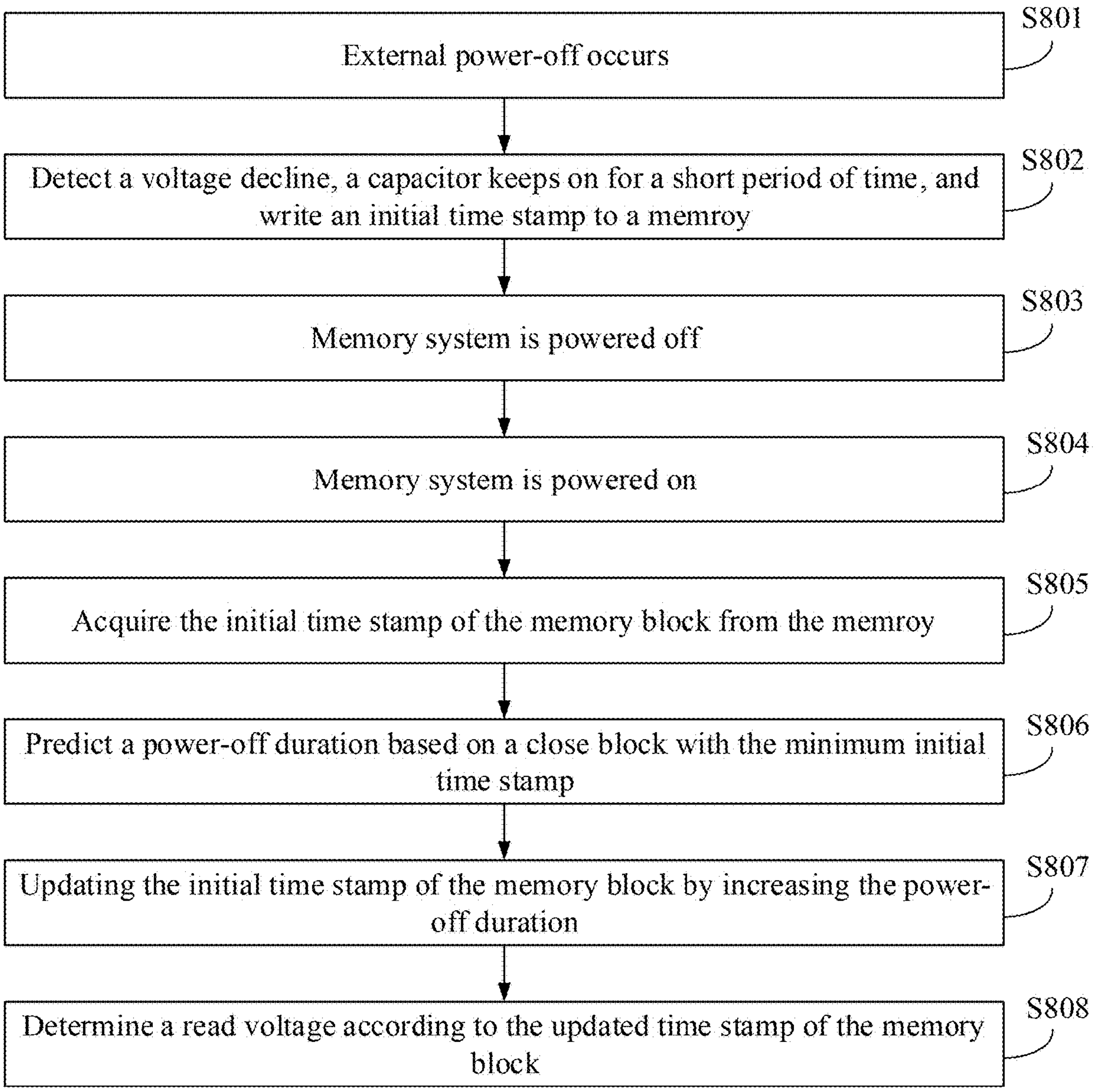
FIG. 8 is a flow diagram of predicting an equivalent power-off duration based on a close block provided by some examples.

Referring to FIG. 8, FIG. 8 is a flow diagram of predicting an equivalent power-off duration based on a close block provided by some examples. As shown in FIG. 8, in operation S801, external power off occurs, e.g., an external power supply is turned off.

In operation S802, a voltage reduction is detected, a capacitor is kept on for a short period of time, and an initial time stamp is written to the memory.

Here, the capacitor may be still kept on for a short period of time after the external power off and before the memory system being powered off, and at this time, the initial time stamp of the memory block may be written to the memory. The initial time stamp refers to the equivalent retention duration for the data stored on the memory block prior to the memory system being powered off. Of course, the initial time stamp may also be referred to as the initial equivalent retention duration, which is determined based on the temperature and the initial physical retention duration.

Herein, since the initial time stamp refers to the equivalent retention duration for the data stored on the memory block prior to the memory system being powered off, only a memory block with data written thereto has an initial time stamp, such as the open block and the close block. That is, a memory block without data written thereto has no initial time stamp. In an example, the initial time stamp may be recorded and timing may be started upon a start of writing a first page of data to the memory block. Of course, the initial time stamp may be recorded and timing may also be started when the memory block is full of written data.

In operation S803, the memory system is powered off, e.g., the memory system is turned off.

In operation S804, power is on again, e.g., external power is on again and the memory system is powered on again.

Herein, from operation S803 to operation S804, e.g., from the memory system being powered off to the memory system being powered on again, the memory system undergoes an equivalent power-off duration, but the memory system is unable to record this equivalent power-off duration.

In operation S805, the initial time stamp of the memory block is acquired from the memory.

Herein, the initial time stamp of the memory block may be read from the memory.

In operation S806, a power-off duration is predicted based on a close block with a minimum initial time stamp.

Herein, a Single-Level Read (SLR) operation may be used to perform a read operation on selected memory cells in the close block with the minimum time stamp; raw data is acquired and a read result is obtained; and the equivalent power-off duration of the memory system is determined according to the read result (e.g., the randomized distribution characteristic value) and a preset mapping table.

Herein, the read operation is performed on the selected memory cells in a selected memory block, and the selected memory cells may refer to all the memory cells included in one page in the selected memory block. It is to be noted that in case of the TLC on which a programming operation has been performed and which may store three bits of data per memory cell, the SLR operation cannot read actual data stored in each memory cell. However, the SLR operation may still be used to characterize an offset of a threshold voltage distribution curve that occurs as the equivalent retention duration varies, with the offset of the threshold voltage distribution curve increasing as the equivalent retention duration increases. As the equivalent retention duration increases, a leftward offset of the threshold voltage distribution curve occurs, and at this time, the "0" count number decreases and the "1" count number increases.

Herein, a distribution of count numbers of the first class of memory cells and the second class of memory cells may be used as the randomized distribution characteristic value, which is the read result of the SLR operation. In other words, the "0" count number or "1" count number may be used as the read result.

In operation S807, the initial time stamp of the memory block is updated by increasing the power-off duration.

Herein, an updated time stamp of the memory block is obtained according to the initial time stamp of the memory block and the equivalent power-off duration of the memory system. The equivalent retention duration for the data stored on the memory block comprises an initial equivalent retention duration prior to the memory system being powered off and the equivalent power-off duration after the memory system being powered off and before the memory system being powered on, e.g., the equivalent retention duration of the memory block=the initial time stamp of the memory block (e.g., the initial equivalent retention duration of the memory block)+the equivalent power-off duration of the memory system.

In operation S808, a read voltage is determined according to the updated time stamp of the memory block.

In the technical solution described above, when the memory system is powered on again after being power off, an SLR operation is performed on the close block in the memory with the minimum initial time stamp, so as to determine the equivalent power-off duration of the memory system. However, in practical application as well as a test scenario, there may be a case where no close block can be found.

Figure 9:
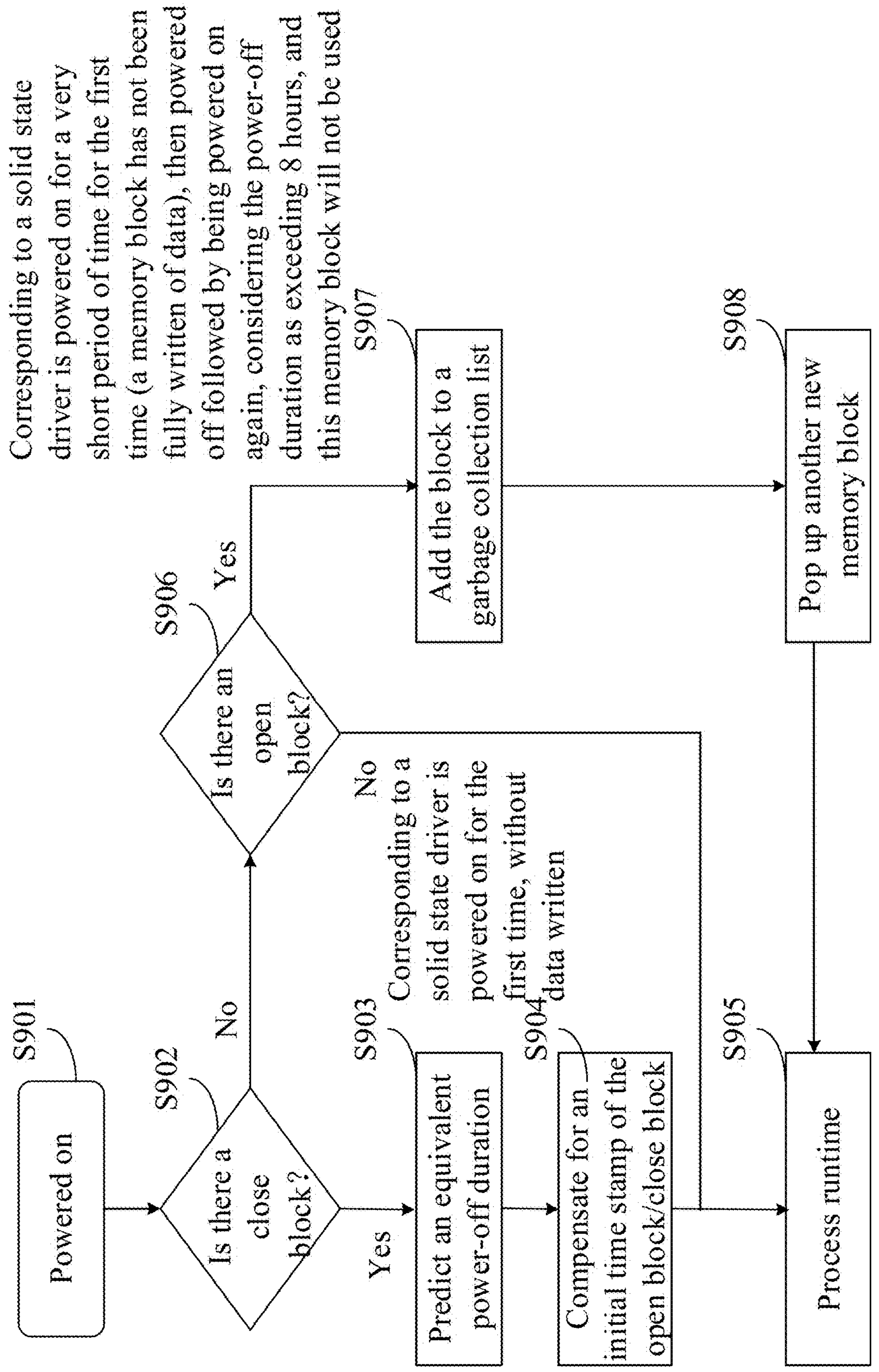
FIG. 9 is a flow diagram of processing based on no close block provided by some examples.

Referring to FIG. 9, FIG. 9 is a flow diagram of processing based on no close block provided by some examples. As shown in FIG. 9, in operation S901, the memory system is powered on.

In operation S902, a judgment as to whether there is a close block in the memory is made; and if a judgment result is "yes", operation S903 is performed to predict the equivalent power-off duration. If the judgment result is "no", operation S906 is performed to judge whether there is an open block in the memory.

In operation S903, the equivalent power-off duration is predicted; in operation S904, a compensation for an initial time stamp of the open block/close block is performed; and in operation S905, runtime is processed.

In operation S906, a judgment as to whether there is an open block in the memory is made; if a judgment result is "yes", operation S907 is performed to add the block to a garbage collection list; in operation S908, another new memory block is popped up; and in operation 905, the runtime is processed. If the judgment result is "no", operation 905 is performed to process the runtime.

Herein, if there is neither a close block nor an open block in the memory, it indicates that the corresponding solid state drive is on and runs for the first time, and no data has been written to the solid state drive; if there is an open storage block but no close block in the memory, it indicates that the corresponding solid state drive is powered on again after power off of the solid state drive following the first time of running with a very short period of time (e.g., there is no memory block full of written data). It is usually considered that if the equivalent power-off duration exceeds 8 hours, the reliability of the data stored on the memory block is hard to be guaranteed, and this memory block will no longer be used.

In the above technical solution, for the case where no close block can be found in the memory, a Garbage Collection (GC) method is required, which may cause side effects such as performance degradation of the memory and a Write Amplification Factor (WAF).

Figure 10:
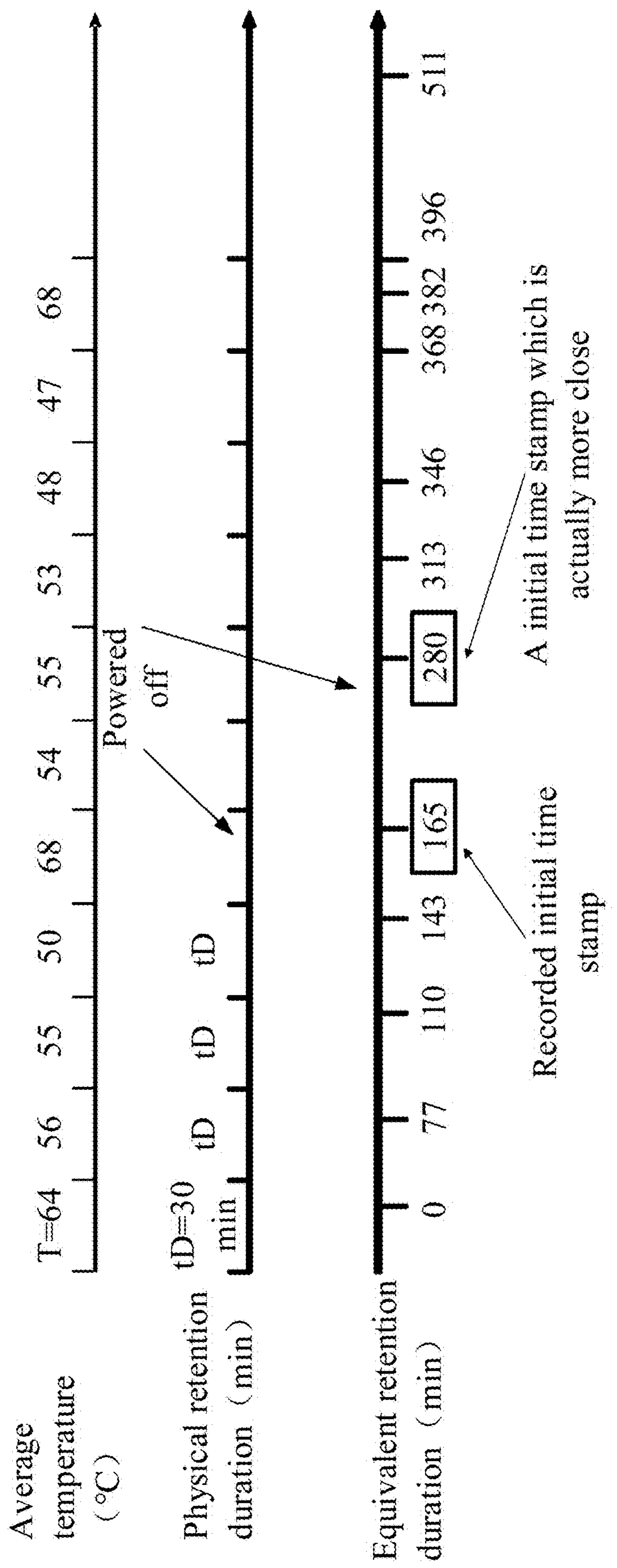
FIG. 10 is a schematic diagram of determining an equivalent retention duration based on an average temperature and a physical retention duration provided by some examples.

Referring to FIG. 10, FIG. 10 is a schematic diagram of determining an equivalent retention duration based on an average temperature and a physical retention duration according to some examples. FIG. 10 illustrates a horizontal axis of average temperature used for recording the average temperature of the memory, such as average temperatures of 64° C., 56° C., and 55° C. FIG. 10 also illustrates horizontal axis of a physical retention duration used for recording the physical retention duration, with each interval on the physical retention duration axis representing a physical retention duration of 30 minutes. FIG. 10 further illustrates a horizontal axis of equivalent retention duration used for recording the equivalent retention duration, which is calculated based on the average temperature and the physical retention duration, with each interval on the equivalent retention duration axis representing a different equivalent retention duration. As the average temperature varies, the equivalent retention duration converted from each physical retention duration of 30 minutes varies.

Herein, the time stamp of the memory block may be updated globally at an update frequency (e.g., every 30 minutes), and the updated time stamp of the memory block may be written to the memory, wherein a time stamp in a last update to the memory system prior to the power off is used as the initial time stamp of the memory block. After the external power off and before the memory system being powered off, the capacitor may be kept on for a short period of time, and the time stamp in the last update is used as the initial time stamp of the memory block and stored in the memory for use after the memory system being powered on.

Herein, if the power off occurs upon imminence of a next update cycle and a time stamp of a last update cycle is recorded in the memory, there is a record error which affects the subsequent prediction of the equivalent power-off duration. For example, an equivalent retention duration recorded in the last update cycle is 165 minutes, the power off occurs upon the imminence of the next update cycle, and an equivalent retention duration recorded in the next update cycle is 280 minutes. That is, in effect, the initial time stamp of the memory block is between 165 minutes and 280 minutes, and the initial time stamp of the memory block is closer to 280 minutes. However, the initial time stamp recorded in the memory is 165 minutes. Accordingly, there is a difference of 30 minutes in the physical retention duration between two adjacent update cycles, while a difference in the equivalent retention duration between the two adjacent update cycles is much longer than 30 minutes.

Upon analysis, it can be seen that in the above technical solution, there is an error in the update frequency of the time stamp, which affects the accuracy of predicting the equivalent power-off duration.

In view of this, examples of the present disclosure provide a memory system and a method of operating thereof, and a computer readable storage medium.

Figure 11:
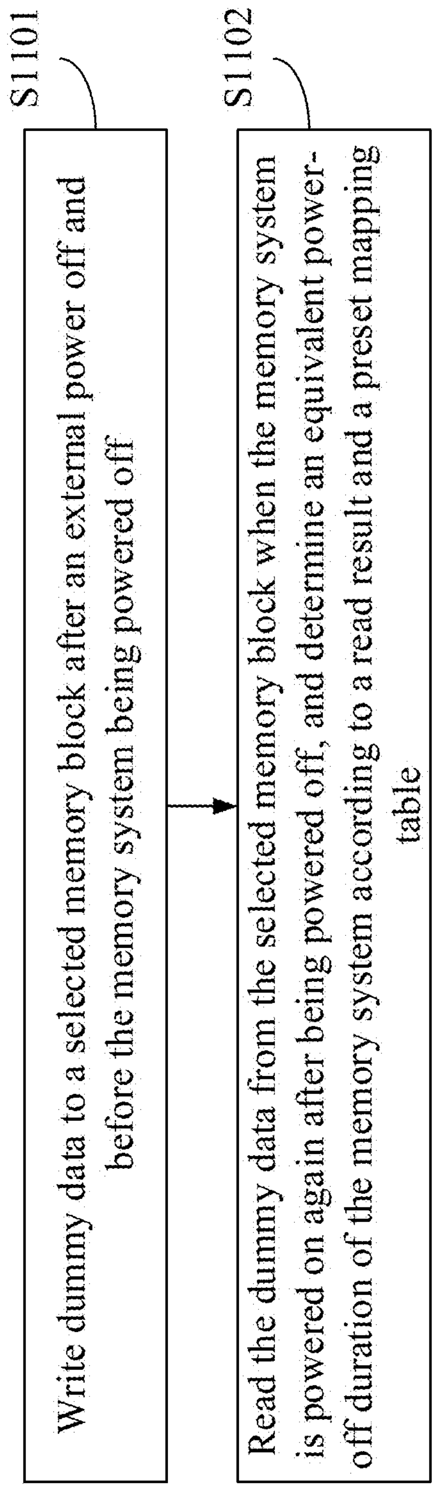
FIG. 11 is a flow diagram of a method of operating a memory system provided by examples of the present disclosure.

Referring to FIG. 11, IG. 11 is a flow diagram of a method of operating a memory system provided by examples of the present disclosure. As shown in FIG. 11 and with reference to FIG. 1, examples of the present disclosure provide a method of operating a memory system. The memory system 102 comprises the memory 104 and the controller 106 coupled to the memory 104, and the memory comprises a plurality of memory blocks. The method comprises:

operation S1101: writing dummy data to a selected memory block after external power off and before the memory system being powered off; and operation S1102: reading the dummy data in the selected memory block when the memory system is powered on again after being powered off, and determining an equivalent power-off duration of the memory system according to a read result and a preset mapping table.

Compared with the SLR operation for determining the equivalent power-off duration of the memory system, in the examples of the present disclosure, the dummy data may be written to the selected memory block after the external power off and before the memory system being powered off, in which case the equivalent retention duration for the dummy data is the equivalent power-off duration of the memory system. As such, the equivalent power-off duration of the memory system may be determined more accurately. Furthermore, in the examples of the present disclosure, the equivalent retention duration for the data stored on the memory block is determined according to the equivalent power-off duration, which is favorable to the determining of a read voltage for performing a subsequent read operation, satisfying the quality of service requirement of a subsequent one-time read pass for the memory system.

In addition, the examples of the present disclosure may cover the extreme scenario and test scenario where no close block can be found in the memory.

Figure 12:
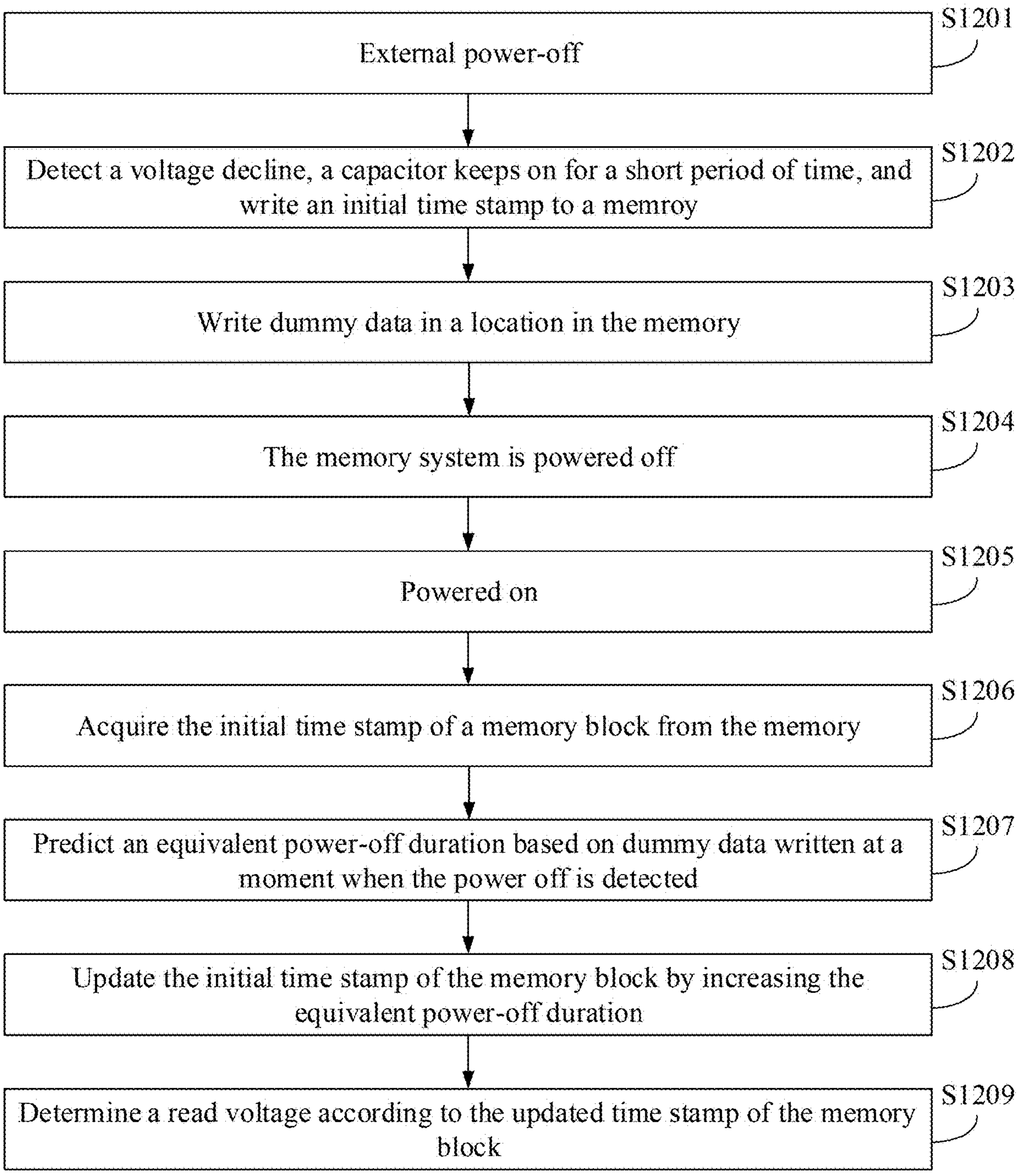
FIG. 12 is a flow diagram of predicting an equivalent power-off duration provided by examples of the present disclosure.

Referring to FIG. 12, FIG. 12 is a flow diagram of predicting an equivalent power-off duration provided by examples of the present disclosure. As shown in FIG. 12, in operation S1201, external power off occurs, e.g., an external power supply is turned off.

In operation S1202, a voltage reduction is detected, a capacitor is kept on for a short period of time, and an initial time stamp is written to the memory.

Herein, the capacitor may be still kept on for a short period of time after the external power off and before the memory system being powered off, and at this time, the initial time stamp of the memory block may be written to the memory. The initial time stamp refers to the equivalent retention duration for the data stored on the memory block prior to the memory system being powered off. Of course, the initial time stamp may also be referred to as the initial equivalent retention duration, which is determined based on based on the temperature and the initial physical retention duration.

Herein, writing the initial time stamp to the memory after the external power off and before the memory system being powered off is not a necessary operation. In some examples, the time stamp of the memory block may be updated globally at an update frequency (e.g., every 30 minutes), and the updated time stamp of the memory block may be written to the memory, wherein a time stamp in a last update to the memory system prior to the power off is used as the initial time stamp of the memory block.

Herein, since the initial time stamp refers to the equivalent retention duration for the data stored on the memory block prior to the memory system being powered off, only a memory block with data written thereto has an initial time stamp, such as the open block and the close block. That is, a memory block without data written thereto has no initial time stamp.

In operation S1203, a search for a location in the memory is performed for writing the dummy data.

In some examples, at least one memory block forms a super block; before the writing the dummy data to the selected memory block, the method further comprises: determining the selected memory block from open blocks; or determining the selected memory block from erase blocks; or determining an orphan block in the memory as the selected memory block.

Herein, the dummy data is written to the selected memory block after the external power off and before the memory system being powered off. The selected memory block may include an open block, an erase block, or an orphan block, and different write locations for the dummy data are described in detail below.

Herein, the memory system may be managed in units of super block, wherein one super block may comprise a plurality of memory blocks, and the plurality of memory blocks included in the super block are operated in parallel.

Figure 13A:
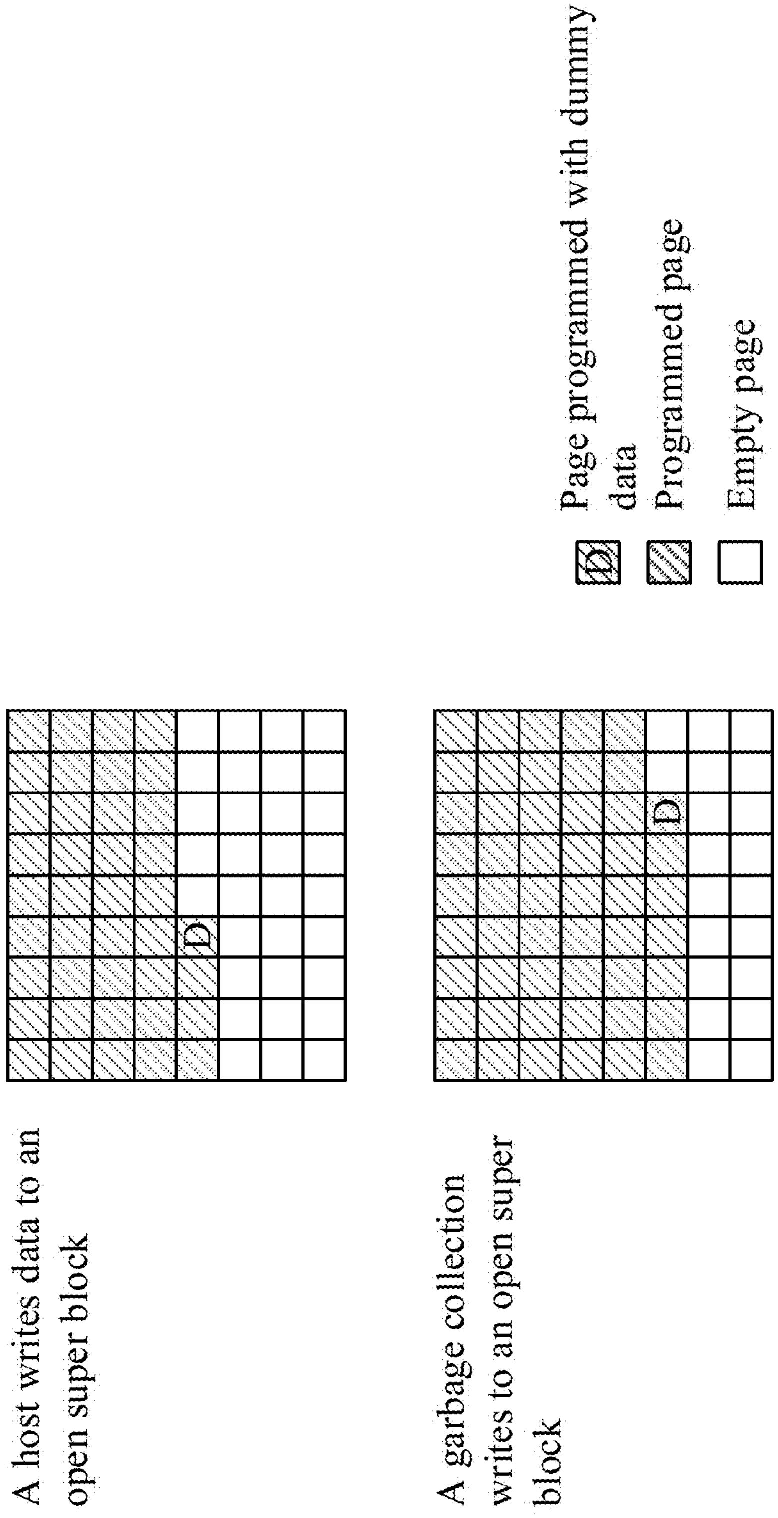
FIG. 13A is a schematic diagram of determining a selected memory block provided by a first example of the present disclosure.

Referring to FIG. 13A, FIG. 13A is a schematic diagram of determining a selected memory block provided by a first example of the present disclosure. As shown in FIG. 13A, the host or the garbage collection performs writing to the open super block, the open super block comprising a plurality of open blocks. In the examples of the present disclosure, a location may be found in a plurality of open blocks included in a current open super block, so as to continue the writing of the dummy data.

It is to be noted that during the writing of the dummy data to the current open block, the write location for the dummy data is variable because the number of pages in the current open block that have been programmed is variable. In addition, since the memory system is managed in the unit of a super block, writing the dummy data to an open block in the current open super block may affect subsequent parallel operations on the plurality of memory blocks included in the super block.

Figure 13B:
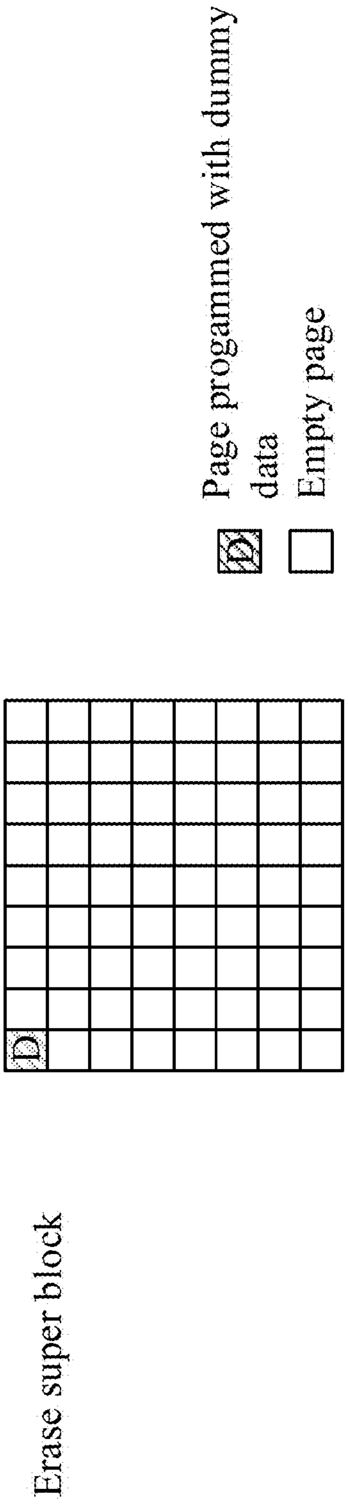
FIG. 13B is a schematic diagram of determining a selected memory block provided by a second example of the present disclosure.

Referring to FIG. 13B, FIG. 13B is a schematic diagram of determining a selected memory block provided by a second example of the present disclosure. As shown in FIG. 13B, the erase super block comprises a plurality of erase blocks. In the examples of the present disclosure, when the memory comprises an erase super block, the dummy data may be written to an erase block included in the erase super block; and when the memory comprises no erase super block, an erase operation may be performed first to obtain an erase super block, and then dummy data is written to an erase block included in the erase super block.

It is to be noted that during the writing of the dummy data to the erase block, the write location for the dummy data is fixed (e.g., Page0). However, on the one hand, after the external power off and before the memory system being powered off, it may be hard to find the erase block included in the erase super block for writing the dummy data, and on the other hand, it takes long time to obtain the erase super block by performing the erase operation, which is difficult to be completed in a duration after the external power off and before the memory system being powered off. In addition, since the memory system is managed in the unit of a super block, writing the dummy data to an erase block in the current erase super block may affect subsequent parallel operations on the plurality of memory blocks included in the super block.

Figure 13C:
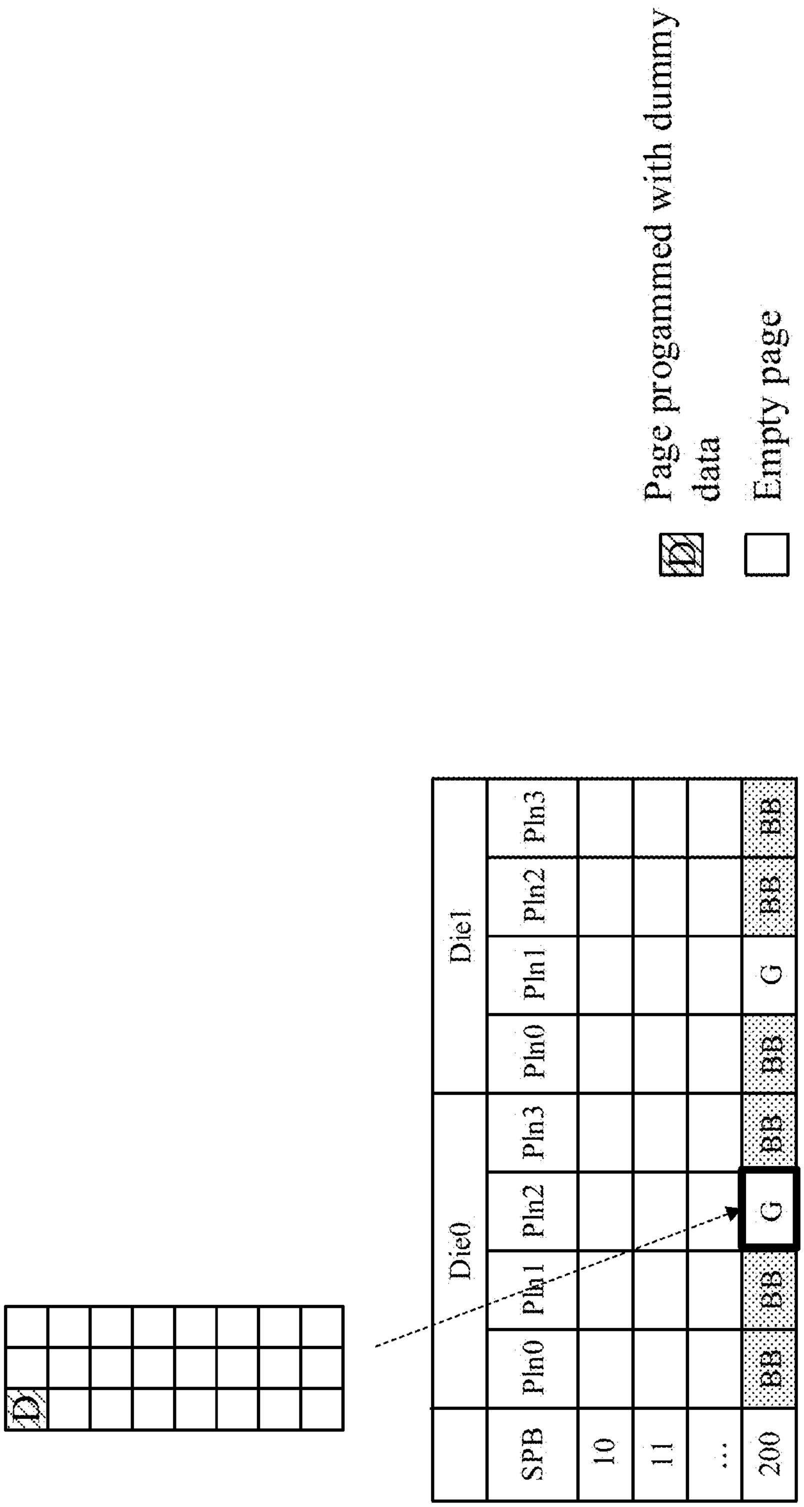
FIG. 13C is a schematic diagram of determining a selected memory block provided by a third example of the present disclosure.

Referring to FIG. 13C, FIG. 13C is a schematic diagram of determining a selected memory block provided by a third example of the present disclosure. As shown in FIG. 13C, a bad super block comprises bad blocks and a few good blocks. For example, a super block SPB200 comprises 8 memory blocks, wherein 6 memory blocks are bad blocks and the other 2 memory blocks are good blocks. These good blocks in the bad super block may be referred to as orphan blocks. In the examples of the present disclosure, a location may be found in the orphan blocks for writing the dummy data.

It is to be noted that during the writing of the dummy data to the orphan blocks, the write location for the dummy data is fixed (e.g., Page0). In addition, since the orphan blocks originally serve as spare blocks and are required to be used only if a bad block occurs, writing the dummy data to the orphan blocks does not affect subsequent parallel operations on the plurality of memory blocks included in the super block. In addition, the location for writing the dummy data is fixed, a corresponding program-erase count is fixed, and the amount of information in the pre-stored preset mapping table may be reduced, thus reducing firmware (FW) overheads.

In operation S1204, the memory system is powered off, e.g., the memory system is turned off.

In operation S1205, the memory system is powered on, e.g., the external power is on again and the memory system is powered on.

Herein, from operation S1204 to operation S1205, e.g., from the memory system being powered off to the memory system being powered on, the memory system undergoes an equivalent power-off duration, but the memory system is unable to directly record this equivalent power-off duration.

In some examples, the method further comprises: acquiring an initial time stamp of the memory block when the memory system is powered on after being powered off, wherein the initial time stamp indicate an initial equivalent retention duration of the memory block prior to being powered off.

In operation S1206, the initial time stamp of the memory block is acquired from the memory.

Herein, the initial time stamp of the memory block may be read from the memory.

In operation S1207, the equivalent power-off duration is predicted based on dummy data written at a moment when the power off is detected.

Herein, after the memory system is powered on, based on the dummy data written before the memory system being powered off, the equivalent retention duration for the dummy data is the equivalent power-off duration of the memory system. Different methods for determining the equivalent retention duration (e.g., the power-off duration of the memory system) for the dummy data are described in detail below.

In a fourth example of the present disclosure, the dummy data is written to the selected memory block after the external power off and before the memory system being powered off; the dummy data is read after the memory system being powered on; and the equivalent retention duration for the dummy data is obtained by querying a second preset mapping table according to a read voltage offset value corresponding to a minimum number of failed bits. It is to be noted that acquiring the number of failed bits requires a having programming operation in a mode the same as the mode of the read operation. In an example, the dummy data is written to the selected memory block using the single-level-cell mode; and correspondingly, the read operation is performed on the dummy data in the selected memory block using the single-level-cell mode. In an example, the dummy data is written to the selected memory block using the multi-level-cell mode; and correspondingly, the read operation is performed on the dummy data in the selected memory block using the multi-level-cell mode.

In some examples, the writing the dummy data to the selected memory block comprises: writing the dummy data to the selected memory block using a multi-level-cell mode, wherein a memory cell having the written dummy data is configured to store one of a plurality of memory states, the plurality of memory states corresponding to a set of read voltages, and the read voltages in the set of read voltages differentiating different memory states.

In an example, the memory cell having the written dummy data may be configured to store one of 4 memory states, and a set of read voltages corresponding to the 4 memory states comprises 3 read voltages; the memory cell having the written dummy data may be also configured to store one of 8 memory state, and a set of read voltages corresponding to the 8 memory states comprises 7 read voltages; and the memory cell having the written dummy data may be also configured to store one of 16 memory state, and a set of read voltages corresponding to the 16 memory states comprises 15 read voltages. The examples of the present disclosure impose no particular limitation on the multi-level-cell mode for writing the dummy data, and example modes including, but not limited to, MLC, TLC, and QLC modes may be used to write the dummy data to the selected memory block.

In some examples, the preset mapping table comprises a second preset mapping table, and the second preset mapping table comprises a mapping relationship between a read voltage offset range and an equivalent retention duration; the equivalent retention duration is determined based on a temperature and a physical retention duration; operation S1102 comprises: performing a read operation on the dummy data in the selected memory block using a mode corresponding to a mode for writing the dummy data, and determining an initial number of failed bits; adjusting a read voltage for performing a read operation, and determining a minimum number of failed bits and a read voltage offset value, wherein the read voltage offset value indicates a difference between a read voltage corresponding to the initial number of failed bits and a read voltage corresponding to the minimum number of failed bits; and determining the equivalent power-off duration of the memory system according to the read voltage offset value and the second preset mapping table.

An illustration is performed using the TLC as an example, and a read voltage is selected, e.g., the seventh read voltage Vrd_p7. During the read operation on the memory, it is required to read the raw data (e.g., randomized data) in the memory; the raw data is de-randomized to obtain the host data; and the host data is decoded through Error Checking and Correcting (ECC), so as to obtain the initial number of failed bits; the read voltage is adjusted (e.g., offsetting the seventh read voltage Vrd_p7 leftward, or decreasing the seventh read voltage Vrd_p7), and the read operation is performed again on the memory using a new read voltage, so as to obtain a new number of failed bits; a plurality of read operation is performed repeatedly until a minimum value of the number of failed bits, e.g., the minimum number of failed bits is found.

Herein, the difference between the read voltage corresponding to the initial number of failed bits and the read voltage corresponding to the minimum number of failed bits is determined as the read voltage offset value.

Herein, there is a mapping relationship between the read voltage offset value and the equivalent retention duration, wherein the absolute value of the read voltage offset value increases as the equivalent retention duration increases. For the corresponding threshold voltage distribution curve, as the equivalent retention duration increases, the threshold voltage distribution curve is offset more, and in an example, the leftward offset of the threshold voltage distribution curve increases. It is to be noted that the positiveness or negativeness of the read voltage offset value represents an offset direction of the read voltage, for example, a negative read voltage offset value represents that the read voltage is offset leftward, e.g., the read voltage is reduced; a positive read voltage offset value represents that the read voltage is offset rightward, e.g., the read voltage is increased.

Herein, the second preset mapping table between a read voltage offset range and an equivalent retention duration may be obtained by pre-characterization, so that the equivalent retention duration may be determined by querying the second preset mapping table according to the read voltage offset value. It is to be noted that the program-erase count and the equivalent retention duration both may affect the read voltage offset value. In case of the same program-erase count, the longer the equivalent retention duration, the larger the absolute value of the read voltage offset value; and in case of the same equivalent retention duration, the larger the program-erase count, the larger the absolute value of the read voltage offset value.

Referring to FIG. 15, FIG. 15 illustrates a second preset mapping table between a read voltage offset value and an equivalent retention duration in case of different erase range intervals provided by the fourth example of the present disclosure. As shown in FIG. 15, the horizontal axis illustrates the read voltage offset range, and for absolute values of read voltage offset values, |U0|<|U1|<|U2|<|U3|<|U4|<|U5|<|U6|<|U7|<|U8|<|U9|<|U10|, that is, read voltage offset ranges gradually increase from left to right. In the direction of the vertical axis, erase count range intervals are illustrated, with program-erase counts 0<P1<P2<P3, that is, the erase count range intervals gradually increase from top to bottom. In addition, the larger a serial number in a designation for an equivalent retention duration, the larger the equivalent retention duration, e.g., M1<M2< . . . <M19.

Herein, for each column illustrated in FIG. 15, in case of the same program-erase count, the equivalent retention duration increases as the read voltage offset range increases. For equivalent retention durations in a first column illustrated in FIG. 15, M6<M10<M11<M12<M13<M14<M15<M16<M17<M18<M19; for equivalent retention durations in a second column, M2<M3<M6<M10<M12<M13<M14<M15<M16<M17<M18; and for equivalent retention durations in a third column, M1<M2<M4<M5<M7<M10<M12<M13<M15<M16<M17.

Herein, in case of the same equivalent retention duration, the larger the program-erase count, the larger the read voltage offset range. In other words, in case of the same read voltage offset range, for each row illustrated in FIG. 15, the equivalent retention duration decreases as the program-erase count increases. For equivalent retention durations in a first row illustrated in FIG. 15, M6>M2>M1; for equivalent retention durations in a second row, M10>M3>M2; for equivalent retention durations in a third row, M11>M6>M4; for equivalent retention durations in a fourth row, M12>M10>M5; for equivalent retention durations in a fifth row, M13>M12>M7; for equivalent retention durations in a sixth row, M14>M13>M10; for equivalent retention durations in a seventh row, M15>M14>M12; for equivalent retention durations in an eighth row, M16>M15>M13; for equivalent retention durations in a ninth row, M17>M16>M15; for equivalent retention durations in a tenth row, M18>M17>M16; and for equivalent retention durations in an eleventh row, M19>M18>M17.

Herein, the read voltage offset value is obtained by performing the read operation on the dummy data; and the equivalent retention duration for the dummy data is determined by querying the second preset mapping table according to read voltage offset value, e.g., the equivalent power-off duration of the memory system is determined.

In a fifth example of the present disclosure, before the memory system being powered off, the dummy data is written to the selected memory block using the multi-level-cell mode; after the memory system being powered on, the dummy data is read using the SLR operation; and the equivalent retention duration for the dummy data is obtained by querying the first preset mapping table according to the randomized distribution characteristic value of the dummy data.

In some examples, the writing the dummy data to the selected memory block comprises: writing the dummy data to the selected memory block using a multi-level-cell mode, wherein a memory cell having the written dummy data is configured to store one of a plurality of memory states, the plurality of memory states corresponding to a set of read voltages, and the read voltages in the set of read voltages are differentiating between the different memory states.

In an example, the memory cell having the written dummy data may be configured to store one of 4 memory states, and a set of read voltages corresponding to the 4 memory states comprises 3 read voltages; the memory cell having the written dummy data may be also configured to store one of 8 memory state, and a set of read voltages corresponding to the 8 memory states comprises 7 read voltages; and the memory cell having the written dummy data may be also configured to store one of 16 memory state, and a set of read voltages corresponding to the 16 memory states comprises 15 read voltages. The examples of the present disclosure impose no particular limitation on the multi-level-cell mode for writing the dummy data, and example modes including, but not limited to, MLC, TLC, and QLC modes may be used to write the dummy data to the selected memory block.

In some examples, the preset mapping table comprises a first preset mapping table, and the first preset mapping table comprises a mapping relationship between a preset number range and an equivalent retention duration; the equivalent retention duration is determined based on a temperature and a physical retention duration; operation S1102 comprises: performing a read operation on the dummy data in the selected memory block based on a read voltage; and determining the equivalent power-off duration of the memory system according to the read result and the first preset mapping table, wherein the read result comprises a count of memory cells each having a threshold voltage greater than or equal to the read voltage and a count of memory cells each having a threshold voltage less than the read voltage.

Figure 14A:
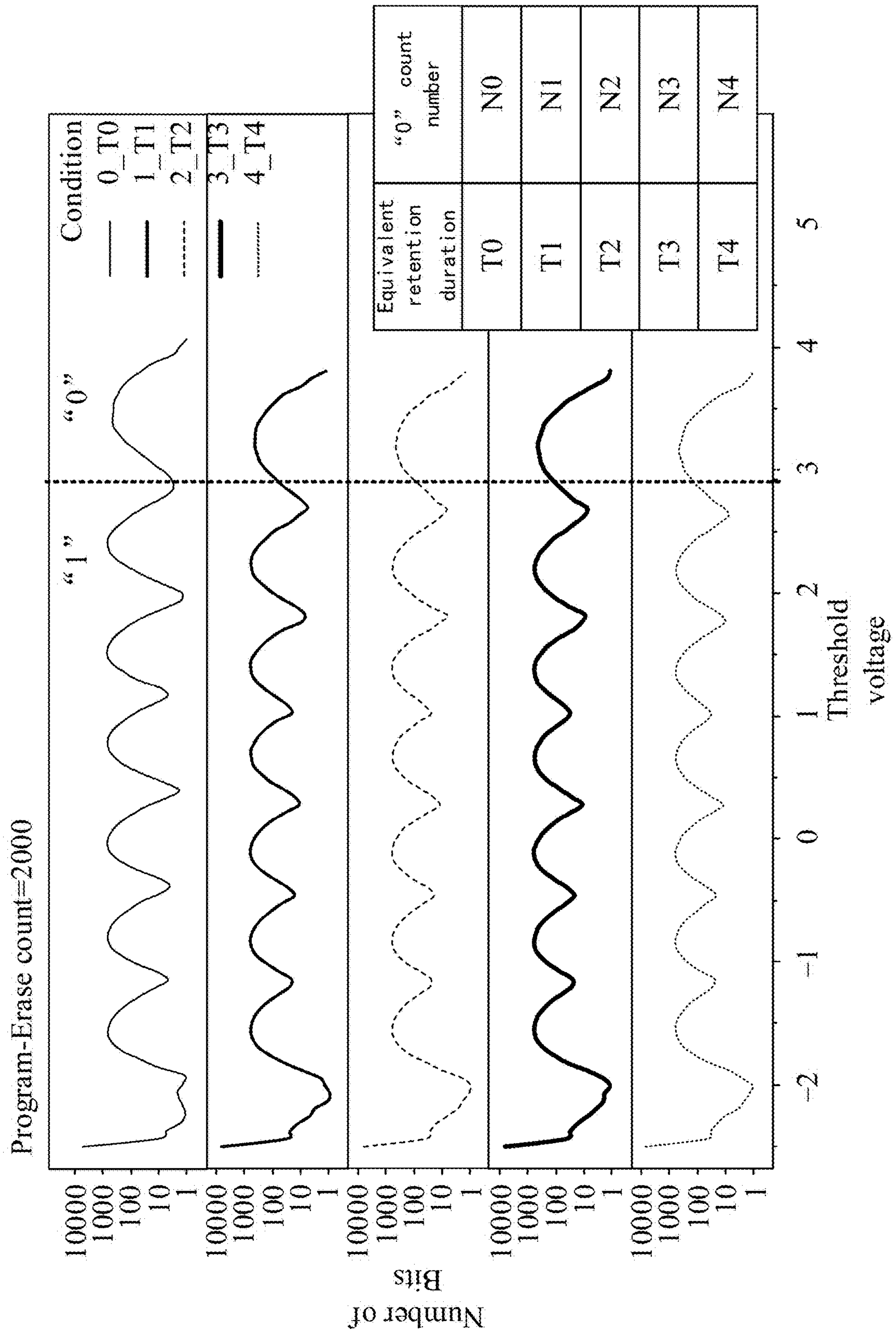
FIG. 14A is a diagram of threshold voltage distributions after different equivalent retention durations provided by a fifth example of the present disclosure.

Referring to FIG. 14A, FIG. 14A is a diagram of threshold voltage distributions after different equivalent retention durations provided by the fifth example of the present disclosure. As shown in FIG. 14A, the illustration is performed using the TLC as an example, with a horizontal coordinate being a threshold voltage, a vertical coordinate being a number of bits, and the program-erase count of the memory cell being 2000. A read voltage is selected, such as the seventh read voltage Vrd_p7, and the SLR operation is performed, with the memory cells on which the SLR operation is performed being classified into two classes. The first class of memory cells each have a threshold voltage less than the seventh read voltage Vrd_p7, and data stored in the first class of memory cells may be regarded as "1"; the second class of memory cells each have a threshold voltage greater than or equal to the seventh read voltage Vrd_p7, and data stored in the second each have a threshold voltage may be regarded as "0". As shown in FIG. 7, the number of the first class of memory cells is the sum of the number of memory cells having the erase state P0 and the number of memory cells having the first program state P1 to the sixth program state P6, and the number of the second class of memory cells is the number of memory cells having the seventh program state P7.

As shown in FIG. 14A, there is a mapping relationship between the "0" count number and the equivalent retention duration, with "0" count numbers N0>N1>N2>N3>N4, and equivalent retention durations T0<T1<T2<T3<T4. That is, the "0" count number decreases as the equivalent retention duration increases.

Herein, the first preset mapping table between a preset number range and an equivalent retention duration may be obtained by pre-characterization, so that the equivalent retention duration may be determined by querying the first preset mapping table according to a read result. It is to be noted that the program-erase count and the equivalent retention duration both may affect the read result. In case of the same program-erase count, the longer the equivalent retention duration, the smaller the "0" count number; and in case of the same equivalent retention duration, the larger the program-erase count, the smaller the "0" count number.

Referring to FIG. 16, FIG. 16 illustrates a first preset mapping table between a randomized distribution range and an equivalent retention duration in case of different erase range intervals provided by the fifth example of the present disclosure. As shown in FIG. 16, tables (a), (b), and (c) of FIG. 16 illustrate preset mapping tables with program-erase counts in ranges of [0, P1), [P1, P2), and [P2, P3), respectively, wherein 0<P1<P2<P3. As shown in table (a) of FIG. 16, the horizontal axis illustrates a sequence number, a lower limit value of a preset number range, an upper limit value of a preset number range, and an equivalent retention duration, respectively. For the equivalent retention durations, M6<M10<M11<M13<M14, that is, the equivalent retention durations gradually increase from bottom to top; in lower and upper limit values of the preset number ranges, for the "0" count numbers, C15>C14>C9>C8. As shown in table (b) of FIG. 16, for the equivalent retention durations, M2<M6<M8<M11<M13<M16, that is, the equivalent retention durations gradually increase from bottom to top; in the lower and upper limit values of the preset number ranges, for the "0" count numbers, C12>C10>C7>C4>C2. As shown in table (c) of FIG. 16, for the equivalent retention durations, M1<M2<M9<M12<M13<M16, that is, the equivalent retention durations gradually increase from bottom to top; in the lower and upper limit values of the preset number ranges, for the "0" count numbers, C13>C11>C6>C5>C3>C1. The larger a serial number in a designation for the lower and upper limit values of the preset number ranges, the larger the "0" count number, e.g., C15>C14> . . . >C1.

Herein, it is considered that the program-erase count and the equivalent retention duration both may affect the "0" count number. In some examples, operation S1102 comprises: determining an erase range interval in which the selected memory block is located according to an erase count of the selected memory block, for example, determining to use the first preset mapping table in tables (a), (b), or (c) of FIG. 16 according to the program-erase count of the selected memory block; and determining the equivalent power-off duration of the memory system according to the read result and the first preset mapping table corresponding to the erase range interval in which the selected memory block is located.

In an example, the use of the preset mapping table in portion (a) of FIG. 16 is determined according to the program-erase count of the selected memory block, for example, the program-erase count of the selected memory block being within the range of [0, P1). According to the "0" count number in the read result, for example, the "0" count number is determined as being within a preset number range of C9 to C14 in the preset mapping table in table (a) of FIG. 16, and the corresponding equivalent retention duration M11 is determined according to the preset number range of C9 to C14.

Herein, the randomized distribution characteristic value (e.g., the "0" count number or the "1" count number) is obtained by performing the read operation on the dummy data; and the equivalent retention duration for the dummy data is determined by querying the first preset mapping table according to the "0" count number, e.g., the equivalent power-off duration of the memory system is determined.

Compared with the fourth example in which the read voltage is adjusted multiple times to determine the equivalent power-off duration of the memory system, in the fifth example of the present disclosure, the SLR operation may be used to quickly obtain state information of the memory cells, which is more time-saving. Moreover, it is more flexible and simpler in operation to determine the equivalent power-off duration of the memory system in combination with the first preset mapping table obtained by pre-characterization. In addition, compared with obtaining the number of failed bits through decoding processing, in the fifth example of the present disclosure, the number of failed bits may be obtained without decoding processing, so that the state information of the memory cells may be still obtained in case of a decoding failure at the end of the service lifespan of the memory system, thereby obtaining the equivalent power-off duration of the memory system, which has a wider range for application.

In addition, in the fifth example of the present disclosure, the randomized distribution characteristic value of the dummy data is known explicitly, and performing the SLR operation on the dummy data to obtain the randomized distribution characteristic value of the read result allows the equivalent power-off duration of the memory system to be determined more accurately.

In a sixth example of the present disclosure, before the memory system being powered off, the dummy data is written to the selected memory block using the single-level-cell mode; after the memory system being powered on, the dummy data is read using the SLR operation; and the equivalent retention duration for the dummy data is obtained by querying the first preset mapping table according to the randomized distribution characteristic value of the dummy data.

In some examples, the writing the dummy data to the selected memory block comprises: writing the dummy data to the selected memory block using a single-level-cell mode, wherein a memory cell having the written dummy data is configured to store either of two memory states, the two memory states corresponding to one read voltage, and the read voltage differentiating between the different memory states.

In some examples, the preset mapping table comprises a first preset mapping table, and the first preset mapping table comprises a mapping relationship between a preset number range and an equivalent retention duration; the equivalent retention duration is determined based on a temperature and a physical retention duration; operation S1102 comprises: performing a read operation on the dummy data in the selected memory block based on the one read voltage; and determining the equivalent power-off duration of the memory system according to the read result and the first preset mapping table, wherein the read result comprises a count of memory cells each having a threshold voltage greater than or equal to the read voltage and a count of memory cells each having a threshold voltage less than the read voltage.

Figure 14B:
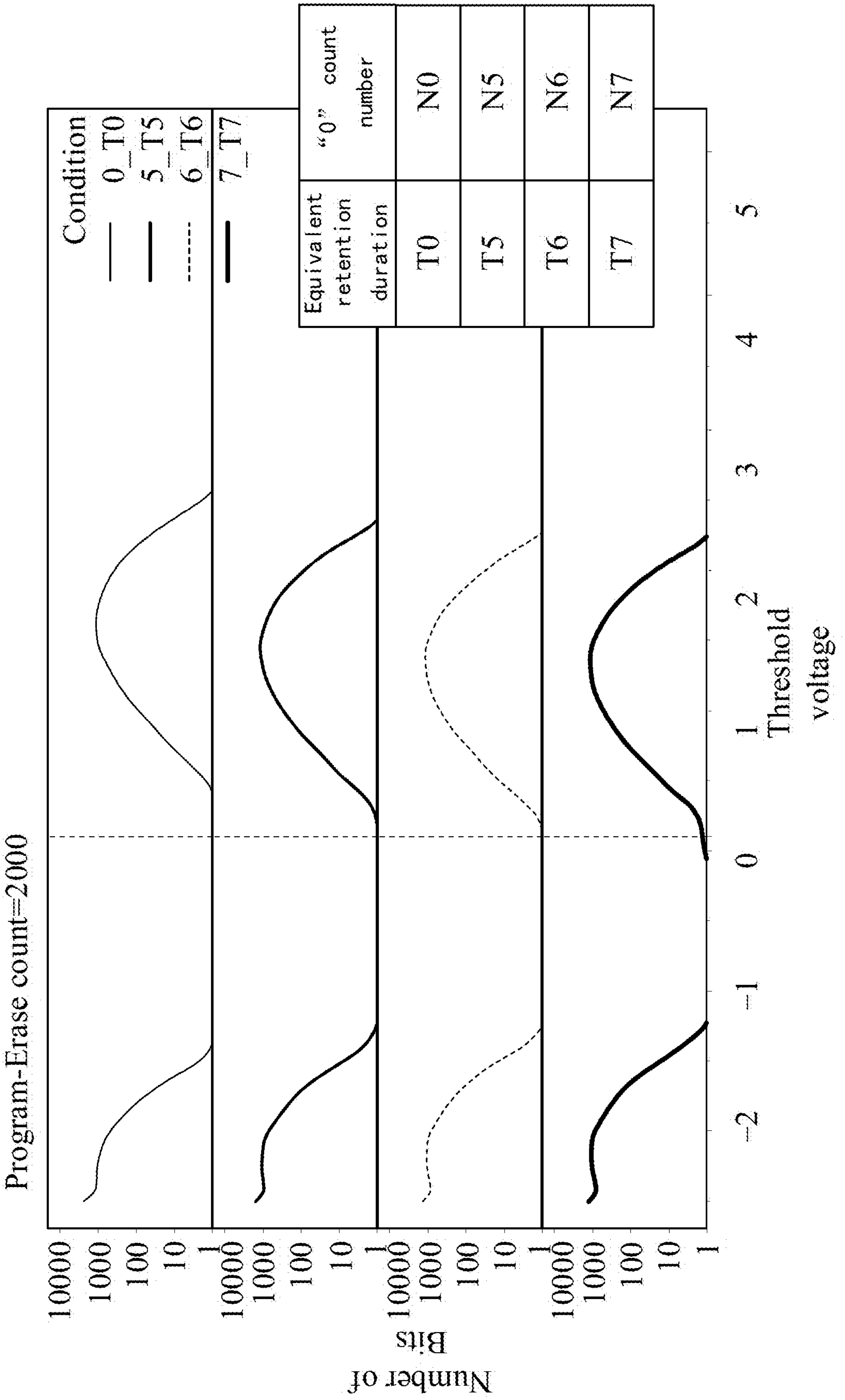
FIG. 14B is a diagram of threshold voltage distributions after different equivalent retention durations provided by a sixth example of the present disclosure.

Referring to FIG. 14B, FIG. 14B is a diagram of threshold voltage distributions after different equivalent retention durations provided by the sixth example of the present disclosure. As shown in FIG. 14B, the programming operation is performed using the single-level-cell mode, with a horizontal coordinate being a threshold voltage, a vertical coordinate being a bit count, and the program-erase count of the memory cell being 2000. The SLR operation is performed using the read voltage, with the memory cells on which the SLR operation is performed being classified into two classes. The first class of memory cells each have a threshold voltage less than the read voltage, and data stored in the first class of memory cells is "1"; the second class of memory cells each have a threshold voltage greater than or equal to the read voltage, and data stored in the second class of memory cells is "0".

As shown in FIG. 14B, there is a mapping relationship between the "0" count number and the equivalent retention duration, with "0" count numbers N0>N5>N6>N7, and equivalent retention durations T0<T5<T6<T7. That is, the "0" count number decreases as the equivalent retention duration increases.

Herein, the first preset mapping table between a preset number range and an equivalent retention duration may be obtained by pre-characterization, so that the equivalent retention duration may be determined by querying the first preset mapping table according to a read result. It is to be noted that the program-erase count and the equivalent retention duration both may affect the read result. In case of the same program-erase count, the longer the equivalent retention duration, the smaller the "0" count number; and in case of the same equivalent retention duration, the larger the program-erase count, the smaller the "0" count number.

Compared with the fourth example in which the read voltage is adjusted multiple times to determine the equivalent power-off duration of the memory system, in the sixth example of the present disclosure, the SLR operation may be used to quickly obtain state information of the memory cells, which is more time-saving. Moreover, it is more flexible and simpler in operation to determine the equivalent power-off duration of the memory system in combination with the first preset mapping table obtained by pre-characterization. In addition, compared with obtaining the number of failed bits through decoding processing, in the sixth example of the present disclosure, the number of failed bits may be obtained without decoding processing, so that the state information of the memory cells may be still obtained in case of a decoding failure at the end of the service lifespan of the memory system, thereby obtaining the equivalent power-off duration of the memory system, which has a wider range for application.

In addition, in the fifth example of the present disclosure, the randomized distribution characteristic value of the dummy data is known explicitly, and performing the SLR operation on the dummy data to obtain the randomized distribution characteristic value of the read result allows the equivalent power-off duration of the memory system to be determined more accurately.

Referring to FIGS. 14A and 14B, regardless of whether the dummy data is written in the TLC mode or the SLC mode, the SLR operation is performed on the dummy data, with the "0" count number decreases as the equivalent retention duration increases in both cases. However, in case of the same equivalent retention duration, the degree of decrease in the "0" count number illustrated in FIG. 14A is greater than the degree of decrease in the "0" count number illustrated in FIG. 14B. In other words, in case of the same equivalent retention duration, a change in the "0" count number in the fifth example of the present disclosure is more significant compared with that in the sixth example of the present disclosure.

Referring to FIG. 17, FIG. 17 is a schematic diagram of updating an initial time stamp of a memory block provided by examples of the present disclosure. As shown in FIG. 17, the horizontal axis illustrates an equivalent retention duration interval, with equivalent retention durations t1<t2<3<t4; the vertical axis illustrates an erase range interval, with the program-erase counts PE_1<PE_2<PE_3. The memory blocks are classified according to the equivalent retention duration and the program-erase count, wherein equivalent retention durations of memory blocks Block_A and Block_B are in the range of <t1 and program-erase counts are in the range of [PE_1, PE_2); equivalent retention durations of memory blocks Block_C, Block_D, and Block_E are in the range of [t1, t2) and program-erase counts are in the range of [PE_1, PE_2); an equivalent retention duration of a memory block Block_F is in the range of [t2, t3) and a program-erase count is in the range of [PE_1, PE_2); and equivalent retention durations of memory blocks Block_G and Block_H are in the range of [t3, t4) and program-erase counts are in the range of [PE_1, PE_2).

In operation S1208, the initial time stamp of the memory block is updated by increasing the equivalent power-off duration.

In operation S1209, a read voltage is determined according to the updated time stamp of the memory block.

In some examples, after the operation S1102, the method further comprises: updating a time stamp of the memory block according to the initial time stamp of the memory block and the equivalent power-off duration, wherein the updated time stamp of the memory block (e.g., the equivalent retention duration of the memory block)=the initial time stamp of the memory block (e.g., the initial equivalent retention duration of the memory block)+the equivalent power-off duration of the memory system; and determining, according to the updated time stamp of the memory block, a read voltage for performing a read operation on the memory block.

In some examples, the determining, according to the updated time stamp of the memory block, the read voltage for performing the read operation on the memory block comprises: determining an equivalent retention duration interval in which the memory block is located according to the updated time stamp of the memory block; and determining, according to the equivalent retention duration interval in which the memory block is located, the read voltage for performing the read operation on the memory block.

As shown in FIG. 17, the equivalent power-off duration is added to the initial time stamp of the memory block, so as to obtain the updated time stamp of the memory block. Accordingly, the memory blocks may be re-classified according to updated time stamps of the memory blocks. The memory blocks are classified according to the equivalent retention duration and the program-erase count, wherein the equivalent retention durations of the memory blocks Block_A and Block_B are increased to be in the range of [t1, t2); the equivalent retention durations of the memory blocks Block_C, Block_D, and Block_E are increased to be in the range of [t2, t3); the equivalent retention duration of the memory block Block_F is increased to be in the range of [t3, t4); and the equivalent retention durations of the memory blocks Block_G and Block_H are increased to be still in the range of [t3, t4). That is, after the equivalent retention durations are increased, the equivalent retention duration ranges in which the memory blocks Block_A, Block_B, Block_C, Block_D, Block_E, and Block_F are located are changed, and accordingly, read voltages for performing read operations on the memory blocks are redetermined according to updated time stamps of the memory blocks. After the equivalent retention durations are increased, the equivalent retention duration ranges in which the memory blocks Block_G and Block_H are located are unchanged, and accordingly, read voltages for performing read operations on the memory blocks are redetermined, according to updated time stamps of the memory blocks, to be unchanged.

In some examples, the method further comprises performing a refresh operation on the memory block if the updated time stamp of the memory block is greater than or equal to an equivalent retention duration threshold.

Herein, if the updated time stamps of the memory blocks are greater than or equal to the equivalent retention duration threshold, it is usually considered that the equivalent retention durations for data stored on these memory blocks is too long, and the reliability of the data stored on the memory blocks is hard to be guaranteed. Therefore, it is required to perform the refresh operation on the memory block. The refresh operation may comprise migrating data stored on the memory block to another memory block and performing an erase operation on the memory block. The examples of the present disclosure impose no particular limitation on the value of the equivalent retention duration threshold, and a person skilled in the art may select the value flexibly according to an actual situation.

It is to be noted that FIG. 15 illustrates squares for equivalent retention durations ≥M14 are filled with a background pattern, indicating that the refresh operation may be performed on the memory block in case of the memory block having an equivalent retention duration ≥M14. Similarly, table (a) in FIG. 16 illustrates a square for the equivalent retention duration M14, and table (b) in FIG. 16 and table (c) in FIG. 13 illustrate a square for the equivalent retention duration M16, both being filled with a background pattern.

In the examples of the present disclosure, the dummy data is written to the selected memory block after the external power off and before the memory system being powered off; and after the memory system being powered on, the equivalent retention duration for the dummy data is determined as the equivalent power-off duration of the memory system. As such, the equivalent power-off duration of the memory system may be determined more accurately, avoiding an error caused by the time stamp update cycle, thereby facilitating the determining of the equivalent retention duration for the data stored on the memory block, which is favorable to the determination of a read voltage for performing a subsequent read operation, satisfying the quality of service requirement of a subsequent one-shot read pass for the memory system.

The preset mapping table obtained by pre-characterization is stored in the memory and can be invoked directly as needed. A process of obtaining the preset mapping table by pre-characterization is described in detail below.

In some examples, the method further comprises: reading a plurality of reference samples, and determining read results of each reference sample in case of different equivalent retention durations; and determining a preset number range in case of the same equivalent retention duration according to read results of the plurality of reference samples in case of the same equivalent retention duration, and determining a mapping relationship between the preset number range and the equivalent retention duration as the first preset mapping table.

Herein, the first preset mapping table comprises the mapping relationship between the preset number range and the equivalent retention duration. In an example, the plurality of reference samples are read, so as to determine "0" count numbers (or "1" count numbers) of each reference sample in case of equivalent retention durations of, for example, 1 day, 5 days, 6 days, 10 days, and 15 days. According to "0" count numbers of the plurality of reference samples in case of an equivalent retention duration of 1 day (or 5, 6, 10, or 15 days), a minimum value and a maximum value of the "0" count numbers in case of the equivalent retention duration of 1 day (or 5, 6, 10, or 15 days) are determined, wherein the minimum value of the "0" count numbers may be used as a lower limit value of the preset number range and the maximum value of the "0" count numbers may be used as an upper limit value of the preset number range. As such, the mapping relationship between the preset number range and the equivalent retention duration may be obtained as the first preset mapping table.

In some examples, the plurality of reference samples are in different erase range intervals. The preset number range of the reference samples in the different erase range intervals in case of the same equivalent retention duration is determined according to the read results of the reference samples in the different erase range intervals in case of the same equivalent retention duration, and the mapping relationship between the preset number range of the reference samples in the different erase range intervals and the equivalent retention duration is determined as the first preset mapping table, wherein a number of erase range intervals is the same as a number of first preset mapping tables.

Herein, the program-erase count and the equivalent retention duration both may affect the read result. Therefore, the first preset mapping table between the preset number range and the equivalent retention duration is obtained under the same erase range interval condition. Different erase range intervals correspond to different first preset mapping tables.

Similarly, the second preset mapping table comprises the mapping relationship between the read voltage offset range and the equivalent retention duration. In an example, the plurality of reference samples are read, so as to determine read voltage offset values of each reference sample in case of equivalent retention durations of, for example, 1 day, 5 days, 6 days, 10 days, and 15 days. According to read voltage offset values of the plurality of reference samples in case of an equivalent retention duration of 1 day (or 5, 6, 10, or 15 days), a minimum value and a maximum value of the read voltage offset values in case of the equivalent retention duration of 1 day (or 5, 6, 10, or 15 days) are determined, wherein the minimum value of absolute values of the read voltage offset values may be used as a lower limit value of a read voltage range and the maximum value of absolute values of the read voltage offset values may be used as an upper limit value of the read voltage range. As such, the mapping relationship between the read voltage range and the equivalent retention duration may be obtained as the second preset mapping table.

Herein, the plurality of reference samples are in different erase range intervals. The read voltage offset range of the reference samples in the different erase range intervals in case of the same equivalent retention duration is determined according to the read results of the reference samples in the different erase range intervals in case of the same equivalent retention duration, and the mapping relationship between the read voltage offset range of the reference samples in the different erase range intervals and the equivalent retention duration is determined as the second preset mapping table, wherein a number of erase range intervals is the same as a number of second preset mapping tables.

When the power on of the memory system using the method provided in the examples of the present disclosure is powered on again after the power off, a command (CMD) waveform is detected using a logic analyzer (LA). Compared with performing a read operation on the close block to determine the equivalent power-off duration of the memory system, in the examples of the present disclosure, a read operation is performed on the dummy data in the open block or erase block to determine the equivalent power-off duration of the memory system.

As shown in FIG. 1, examples of the present disclosure provide a memory system. The memory system 102 comprises the memory 104 and the controller 106 coupled to the memory 104, and the memory comprises a plurality of memory blocks. The controller 106 is configured to: write dummy data to a selected memory block after external power off and before the memory system being powered off; and read the dummy data in the selected memory block when the memory system is powered on again after being powered off, and determine an equivalent power-off duration of the memory system according to a read result and a preset mapping table.

In some examples, the controller 106 is further configured to: acquire an initial time stamp of the memory block when the memory system being powered on again after being powered off, wherein the initial time stamp indicates an initial equivalent retention duration of the memory block prior to being powered off; and the initial equivalent retention duration is determined based on a temperature and an initial physical retention duration.

In some examples, the controller 106 is configured to: write the dummy data to the selected memory block using a multi-level-cell mode, wherein a memory cell having the written dummy data is configured to store one of a plurality of memory states, the plurality of memory states corresponding to a set of read voltages, and the read voltages in the set of read voltages differentiating between the different memory states.

In some examples, the controller 106 is configured to: write the dummy data to the selected memory block using a single-level-cell mode, wherein a memory cell having the written dummy data is configured to store either of two memory states, the two memory states corresponding to one read voltage, and the read voltage differentiating between the different memory states.

In some examples, the comprises a first preset mapping table, and the first preset mapping table comprises a mapping relationship between a preset number range and an equivalent retention duration; the equivalent retention duration is based on a temperature and a physical retention duration; the controller 106 is configured to: perform a read operation on the dummy data in the selected memory block based on the one; and determine the equivalent power-off duration of the memory system according to the read result and the first preset mapping table, wherein the read result comprises a count of memory cells each having a threshold voltage greater than or equal to the read voltage and a count of memory cells each having a threshold voltage less than the read voltage, and the equivalent power-off duration is an equivalent retention duration for the dummy data.

In some examples, the controller 106 is further configured to: read a plurality of reference samples, and determine read results of each reference sample in case of different equivalent retention durations; and determine a preset number range in case of the same equivalent retention duration according to read results of the plurality of reference samples in case of the same equivalent retention duration, and determine a mapping relationship between the preset number range and the equivalent retention duration as the first preset mapping table.

In some examples, the plurality of reference samples are in different erase range intervals; the controller 106 is configured to: determine the preset number range of the reference samples in the different erase range intervals in case of the same equivalent retention duration according to the read results of the reference samples in the different erase range intervals in case of the same equivalent retention duration, and determine the mapping relationship between the preset number range of the reference samples in the different erase range intervals and the equivalent retention duration as the first preset mapping table, wherein the number of erase range intervals is the same as the number of first preset mapping tables.

In some examples, the controller 106 is configured to: determine an erase range interval in which the selected memory block is located according to an erase count of the selected memory block; and determine the equivalent power-off duration of the memory system according to the read result and the first preset mapping table corresponding to the erase range interval in which the selected memory block is located.

In some examples, the preset mapping table comprises a second preset mapping table, and the second preset mapping table comprises a mapping relationship between a read voltage offset range and an equivalent retention duration; the equivalent retention duration is determined based on a temperature and a physical retention duration; the controller 106 is configured to: perform a read operation on the dummy data in the selected memory block using a multi-level-cell mode, and determine an initial number of failed bits; adjust a read voltage for performing a read operation, and determine a minimum number of failed bits and a read voltage offset value, wherein the read voltage offset value indicates a difference between a read voltage corresponding to the initial number of failed bits and a read voltage corresponding to the minimum number of failed bits; and determine the equivalent power-off duration of the memory system according to the read voltage offset value and the second preset mapping table, wherein the equivalent power-off duration is an equivalent retention duration for the dummy data.

In some examples, the controller 106 is further configured to: update a time stamp of the memory block according to the initial time stamp of the memory block and the equivalent power-off duration; and determine, according to the updated time stamp of the memory block, a read voltage for performing a read operation on the memory block, wherein the updated time stamp indicates a sum of the initial equivalent retention duration of the memory block prior to being powered off and the equivalent power-off duration.

In some examples, the controller 106 is configured to: determine an equivalent retention duration interval in which the memory block is located according to the updated time stamp of the memory block; and determine, according to the equivalent retention duration interval in which the memory block is located, the read voltage for performing the read operation on the memory block.

In some examples, the controller 106 is configured to: perform a refresh operation on the memory block if the updated time stamp of the memory block is greater than or equal to an equivalent retention duration threshold.

In some examples, at least one memory block forms a super block; the controller 106 is further configured to: determine the selected memory block from open blocks; or determine the selected memory block from erase blocks; or determine an orphan block in the memory as the selected memory block.

Examples of the present disclosure provide a computer readable storage medium storing a computer program which, when executed, may implement the method of operating a memory system in the above technical solution.

In the examples of the present disclosure, the computer readable storage medium may comprise: a Random Access Memory (RAM), a memory, a Read-Only Memory (ROM), an electrically programmable ROM, an electrically erasable programmable ROM, a register, a hard disk, a removable disk, a read only compact disc (CD-ROM), or any other forms of media of program codes well-known in the art.

Examples of the present disclosure provide a memory system and a method of operating thereof, and a computer readable storage medium. In the examples of the present disclosure, the dummy data is written to the selected memory block after the external power off and before the memory system being powered off; the dummy data is read after the memory system being powered on again, and the equivalent power-off duration of the memory system is determined according to the read result and the preset mapping table. At this time, the equivalent retention duration for the dummy data is the equivalent power-off duration of the memory system. As such, the equivalent power-off duration of the memory system may be determined more accurately, thereby facilitating the determining of the equivalent retention duration for the data stored on the memory block, which is favorable to the determining of a read voltage for performing a subsequent read operation, satisfying the quality of service requirement of a subsequent one-shot read pass for the memory system.

In view of this, examples of the present disclosure provide a memory system and a method of operating thereof, and a computer readable storage medium.

In a first aspect, examples of the present disclosure provide a method of operating a memory system, wherein the memory system comprises a memory and a controller coupled to the memory, and the memory comprises a plurality of memory blocks; the method comprises: writing dummy data to a selected memory block after external power off and before the memory system being powered off; and reading the dummy data in the selected memory block when the memory system is powered on again after being powered off, and determining an equivalent power-off duration of the memory system according to a read result and a preset mapping table.

In some examples, the method further comprises: acquiring an initial time stamp of the memory block when the memory system being powered on after the power off, wherein the initial time stamp indicate an initial equivalent retention duration of the memory block prior to the power off; and the initial equivalent retention duration is determined based on a temperature and an initial physical retention duration.

In some examples, the writing the dummy data to the selected memory block comprises: writing the dummy data to the selected memory block using a multi-level-cell mode, wherein a memory cell having the written dummy data is configured to store one of a plurality of memory states, the plurality of memory states corresponding to a set of read voltages, and the read voltages in the set of read voltages differentiating the different memory states.

In some examples, the writing the dummy data to the selected memory block comprises: writing the dummy data to the selected memory block using a single-level-cell mode, wherein a memory cell having the written dummy data is configured to store either of two memory states, the two memory states corresponding to one read voltage, and the read voltage differentiating the different memory states.

In some examples, the preset mapping table comprises a first preset mapping table, and the first preset mapping table comprises a mapping relationship between a preset number range and an equivalent retention duration; the equivalent retention duration is determined based on a temperature and a physical retention duration; the reading the dummy data in the selected memory block and determining the equivalent power-off duration of the memory system according to the read result and the preset mapping table comprises: performing a read operation on the dummy data in the selected memory block based on the one read voltage; and determining the equivalent power-off duration of the memory system according to the read result and the first preset mapping table, wherein the read result comprises a count of memory cells each having a threshold voltage greater than or equal to the read voltage and a count of memory cells each having a threshold voltage less than the read voltage, and the equivalent power-off duration is an equivalent retention duration for the dummy data.

In some examples, the method further comprises: reading a plurality of reference samples, and determining read results of each reference sample in case of different equivalent retention durations; and determining a preset number range in case of the same equivalent retention duration according to read results of the plurality of reference samples in case of the same equivalent retention duration, and determining a mapping relationship between the preset number range and the equivalent retention duration as the first preset mapping table.

In some examples, the plurality of reference samples are in different erase range intervals; the determining the preset number range in case of the same equivalent retention duration according to the read results of the plurality of reference samples in case of the same equivalent retention duration, and determining the mapping relationship between the preset number range and the equivalent retention duration as the first preset mapping table comprises: determining the preset number range of the reference samples in the different erase range intervals in case of the same equivalent retention duration according to the read results of the reference samples in the different erase range intervals in case of the same equivalent retention duration, and determining the mapping relationship between the preset number range of the reference samples in the different erase range intervals and the equivalent retention duration as the first preset mapping table, wherein a number of erase range intervals is the same as a number of first preset mapping tables.

In some examples, the reading the dummy data in the selected memory block and determining the equivalent power-off duration of the memory system according to the read result and the preset mapping table comprises: determining an erase range interval in which the selected memory block is located according to an erase count of the selected memory block; and determining the equivalent power-off duration of the memory system according to the read result and the first preset mapping table corresponding to the erase range interval in which the selected memory block is located.

In some examples, the preset mapping table comprises a second preset mapping table, and the second preset mapping table comprises a mapping relationship between a read voltage offset range and an equivalent retention duration; the equivalent retention duration is determined based on a temperature and a physical retention duration; the reading the dummy data in the selected memory block and determining the equivalent power-off duration of the memory system according to the read result and the preset mapping table comprises: performing a read operation on the dummy data in the selected memory block using a mode corresponding to writing of the dummy data, and determining an initial number of failed bits; adjusting a read voltage for performing a read operation, and determining a minimum number of failed bits and a read voltage offset value, wherein the read voltage offset value indicate a difference between a read voltage corresponding to the initial number of failed bits and a read voltage corresponding to the minimum number of failed bits; and determining the equivalent power-off duration of the memory system according to the read voltage offset value and the second preset mapping table, wherein the equivalent power-off duration is an equivalent retention duration for the dummy data.

In some examples, after the reading the dummy data in the selected memory block and determining the equivalent power-off duration of the memory system according to the read result and the preset mapping table, the method further comprises: updating a time stamp of the memory block according to the initial time stamp of the memory block and the equivalent power-off duration; and determining, according to the updated time stamp of the memory block, a read voltage for performing a read operation on the memory block, wherein the updated time stamp indicate a sum of the initial equivalent retention duration of the memory block prior to being powered off and the equivalent power-off duration.

In some examples, the determining, according to the updated time stamp of the memory block, the read voltage for performing the read operation on the memory block comprises: determining an equivalent retention duration interval in which the memory block is located according to the updated time stamp of the memory block; and determining, according to the equivalent retention duration interval in which the memory block is located, the read voltage for performing the read operation on the memory block.

In some examples, the method further comprises: performing a refresh operation on the memory block if the updated time stamp of the memory block is greater than or equal to an equivalent retention duration threshold.

In some examples, at least one memory block forms a super block; before the writing the dummy data to the selected memory block, the method further comprises: determining the selected memory block from open blocks;

or determining the selected memory block from erase blocks; or determining an orphan block in the memory as the selected memory block.

In a second aspect, examples of the present disclosure provide a memory system comprising a memory and a controller coupled to the memory, the memory comprising a plurality of memory blocks, and the controller being configured to: write dummy data to a selected memory block after external power off and before the memory system being powered off; and read the dummy data in the selected memory block when the memory system is powered on again after being powered off, and determine an equivalent power-off duration of the memory system according to a read result and a preset mapping table.

In some examples, the controller is further configured to: acquire an initial time stamp of the memory block when the memory system being powered on again after the power off, wherein the initial time stamp indicate an initial equivalent retention duration of the memory block prior to being powered off; and the initial equivalent retention duration is determined based on a temperature and an initial physical retention duration.

In some examples, the controller is configured to: write the dummy data to the selected memory block using a multi-level-cell mode, wherein a memory cell having the written dummy data is configured to store one of a plurality of memory states, the plurality of memory states corresponding to a set of read voltages, and the read voltages in the set of read voltages differentiating the different memory states.

In some examples, the controller is configured to: write the dummy data to the selected memory block using a single-level-cell mode, wherein a memory cell having the written dummy data is configured to store either of two memory states, the two memory states corresponding to one read voltage, and the read voltage differentiating the different memory states.

In some examples, the comprises a first preset mapping table, and the first preset mapping table comprises a mapping relationship between a preset number range and an; the equivalent retention duration is based on a temperature and a physical retention duration; the controller is configured to: perform a read operation on the dummy data in the selected memory block based on the one; and determine the equivalent power-off duration of the memory system according to the read result and the first preset mapping table, wherein the read result comprises a count of memory cells each having a threshold voltage greater than or equal to the read voltage and a count of memory cells each having a threshold voltage less than the read voltage, and the equivalent power-off duration is an equivalent retention duration for the dummy data.

In some examples, the controller is further configured to: read a plurality of reference samples, and determine read results of each reference sample in case of different equivalent retention durations; and determine a preset number range in case of the same equivalent retention duration according to read results of the plurality of reference samples in case of the same equivalent retention duration, and determine a mapping relationship between the preset number range and the equivalent retention duration as the first preset mapping table.

In some examples, the plurality of reference samples are in different erase range intervals; the controller is configured to: determine the preset number range of the reference samples in the different erase range intervals in case of the same equivalent retention duration according to the read results of the reference samples in the different erase range intervals in case of the same equivalent retention duration, and determine the mapping relationship between the preset number range of the reference samples in the different erase range intervals and the equivalent retention duration as the first preset mapping table, wherein a number of erase range intervals is the same as a number of first preset mapping tables.

In some examples, the controller is configured to: determine an erase range interval in which the selected memory block is located according to an erase count of the selected memory block; and determine the equivalent power-off duration of the memory system according to the read result and the first preset mapping table corresponding to the erase range interval in which the selected memory block is located.

In some examples, the preset mapping table comprises a second preset mapping table, and the second preset mapping table comprises a mapping relationship between a read voltage offset range and an equivalent retention duration; the equivalent retention duration is determined based on a temperature and a physical retention duration; the controller is configured to: perform a read operation on the dummy data in the selected memory block using a multi-level-cell mode, and determine an initial number of failed bits; adjust a read voltage for performing a read operation, and determine a minimum number of failed bits and a read voltage offset value, wherein the read voltage offset value indicate a difference between a read voltage corresponding to the initial number of failed bits and a read voltage corresponding to the minimum number of failed bits; and determine the equivalent power-off duration of the memory system according to the read voltage offset value and the second preset mapping table, wherein the equivalent power-off duration is an equivalent retention duration for the dummy data.

In some examples, the controller is further configured to: update a time stamp of the memory block according to the initial time stamp of the memory block and the equivalent power-off duration; and determine, according to the updated time stamp of the memory block, a read voltage for performing a read operation on the memory block, wherein the updated time stamp indicates a sum of the initial equivalent retention duration of the memory block prior to the power off and the equivalent power-off duration.

In some examples, the controller is configured to: determine an equivalent retention duration interval in which the memory block is located according to the updated time stamp of the memory block; and determine, according to the equivalent retention duration interval in which the memory block is located, the read voltage for performing the read operation on the memory block.

In some examples, the controller is configured to: perform a refresh operation on the memory block if the updated time stamp of the memory block is greater than or equal to an equivalent retention duration threshold.

In some examples, at least one memory block forms a super block; the controller is further configured to: determine the selected memory block from open blocks; or determine the selected memory block from erase blocks; or determine an orphan block in the memory as the selected memory block.

In a third aspect, examples of the present disclosure provide a computer-readable storage medium storing a computer program which, when executed, may implement the method of operating a memory system described in the first aspect of the present disclosure.

Examples of the present disclosure provide a memory system and a method of operating thereof, and a computer readable storage medium. In the examples of the present disclosure, the dummy data is written to the selected memory block after the external power off and before the memory system being powered off; the dummy data is read after the memory system being powered on again, and the equivalent power-off duration of the memory system is determined according to the read result and the preset mapping table. At this time, the equivalent retention duration for the dummy data is the equivalent power-off duration of the memory system. As such, the equivalent power-off duration of the memory system may be determined more accurately, thereby facilitating the determination of the equivalent retention duration for the data stored on the memory block, which is favorable to the determination of a read voltage for performing a subsequent read operation, satisfying the quality of service requirement of a subsequent one-shot read pass for the memory system.

It is to be understood that "one example" and "an example" mentioned throughout specification mean that particular features, structures or characteristics related to the example is included in at least one example of the present disclosure. Therefore, "in one example" or "in an example" presented throughout this specification does not necessarily refer to the same example. In addition, these specific features, structures or characteristics may be combined in one or more examples in any suitable manner. It is to be understood that, in various examples of the present disclosure, sequence numbers of the above processes do not indicate an execution sequence, and an execution sequence of various processes shall be determined by functionalities and intrinsic logics thereof and shall constitute no limitation on an implementation process of the examples of the present disclosure. The above sequence numbers of the examples of the present disclosure are only for description, and do not represent advantages or disadvantages of the examples.

The above descriptions are merely preferred implementations of the present disclosure, and not intended to limit the scope of the present disclosure. Equivalent structure transformation made within using the contents of the specification and the drawings of the present disclosure under the inventive concept of the present disclosure, or direct/indirect application to other related technical fields are both encompassed within the protection scope of the present disclosure.

What is claimed is:

1. A method of operating a memory system, wherein the memory system includes a memory including memory blocks, and a controller coupled to the memory, the method comprises:

- writing, after an external power-off and prior to the memory system being powered off, dummy data to a selected memory block;
- reading, when the memory system is powered on again after being powered off, the dummy data from the selected memory block;
- determining an equivalent power-off duration of the memory system according to a read result and a preset mapping table;
- acquiring an initial time stamp of a memory block of the memory blocks when the memory system is powered on again after being powered off, wherein the initial time stamp indicates an initial equivalent retention duration of the memory block prior to being powered off, and the initial equivalent retention duration is determined based on a temperature and an initial physical retention duration;
- updating a time stamp of the memory block according to the initial time stamp of the memory and the equivalent power-off duration; and
- determining, according to the updated time stamp of the memory block, a read voltage for performing a read operation on the memory block, wherein the updated time stamp is to indicate a sum of the initial equivalent retention duration of the memory block prior to being powered off and the equivalent power-off duration.

2. The method of claim 1, wherein writing the dummy data to the selected memory block includes writing the dummy data to the selected memory block using a multi-level-cell mode, wherein a memory cell having the written dummy data is configured to store one of memory states, the memory states corresponding to a set of read voltages, and read voltages in the set of read voltages differentiate different memory states.

3. The method of claim 1, wherein writing the dummy data to the selected memory block includes writing the dummy data to the selected memory block using a single-level-cell mode, wherein a memory cell having the written dummy data is configured to store either of two memory states, the two memory states corresponding to one read voltage, and the one read voltage differentiating different memory states.

4. The method of claim 2, wherein the preset mapping table includes a first preset mapping table, the first preset mapping table includes a mapping relationship between a preset number range and an equivalent retention duration, and the equivalent retention duration is determined based on the temperature and a physical retention duration, and wherein

- reading the dummy data from the selected memory block and determining the equivalent power-off duration of the memory system according to the read result and the preset mapping table includes:
  - performing a read operation on the dummy data in the selected memory block based on a read voltage; and
  - determining the equivalent power-off duration of the memory system according to the read result and the first preset mapping table, wherein the read result includes a first count of memory cells each having a threshold voltage greater than or equal to the read voltage and a second count of memory cells each having a threshold voltage less than the read voltage, and the equivalent retention duration for the dummy data equals the equivalent power-off duration.

5. The method of claim 4, further including:

- reading reference samples to determine read results of the reference samples in case of different equivalent retention durations;
- determining the preset number range in case of a same equivalent retention duration according to the read results of the reference samples; and
- determining the mapping relationship between the preset number range and the equivalent retention duration as the first preset mapping table.

6. The method of claim 5, wherein the reference samples are in different erase range intervals, and

- determining the preset number range in the case of the same equivalent retention duration according to the read results of the reference samples, and determining the mapping relationship between the preset number range and the equivalent retention duration as the first preset mapping table includes:
  - determining the preset number range of the reference samples in the different erase range intervals in the case of the same equivalent retention duration according to the read results of the reference samples in the different erase range intervals; and determining the mapping relationship between the preset number range of the reference samples in the different erase range intervals and the equivalent retention duration as the first preset mapping table, wherein a number of the different erase range intervals is the same as a number of first preset mapping tables.

7. The method of claim 6, wherein reading the dummy data from the selected memory block and determining the equivalent power-off duration of the memory system according to the read result and the preset mapping table includes:

determining an erase range interval of the erase range intervals in which the selected memory block is located according to an erase count of the selected memory block; and determining the equivalent power-off duration of the memory system according to the read result and the first preset mapping table corresponding to the erase range interval in which the selected memory block is located.

8. The method of claim 2, wherein the preset mapping table includes a second preset mapping table, the second preset mapping table includes a mapping relationship between a read voltage offset range and an equivalent retention duration, and the equivalent retention duration is determined based on the temperature and a physical retention duration, and wherein reading the dummy data from the selected memory block and determining the equivalent power-off duration of the memory system according to the read result and the preset mapping table includes:

performing a read operation on the dummy data in the selected memory block using a mode corresponding to writing of the dummy data, and determining an initial number of failed bits;

adjusting a read voltage for performing the read operation, and determining a minimum number of failed bits and a read voltage offset value, wherein the read voltage offset value indicates a difference between a read voltage corresponding to the initial number of failed bits and a read voltage corresponding to the minimum number of failed bits; and determining the equivalent power-off duration of the memory system according to the read voltage offset value and the second preset mapping table, wherein the equivalent retention duration for the dummy data equals the equivalent power-off duration.

9. The method of claim 1, wherein determining, according to the updated time stamp of the memory block, the read voltage for performing the read operation on the memory block includes:

determining, according to the updated time stamp of the memory block, an equivalent retention duration range in which the memory block is located; and determining, according to the equivalent retention duration range in which the memory block is located, the read voltage for performing the read operation on the memory block.

10. The method of claim 1, further including performing a refresh operation on the memory block if the updated time stamp of the memory block is greater than or equal to an equivalent retention duration threshold.

11. The method of claim 1, wherein at least one memory block of the memory blocks forms a super block, and the method further includes, prior to writing the dummy data to the selected memory block:

determining the selected memory block from open blocks;

determining the selected memory block from erase blocks; or determining an orphan block in the memory as the selected memory block.

12. A memory system, comprising:

a memory including memory blocks; and a controller coupled to the memory and being configured to:

write, after an external power-off and prior to the memory system being powered off, dummy data to a selected memory block;

read, when the memory system is powered on again after being powered off, the dummy data from the selected memory block;

determine an equivalent power-off duration of the memory system according to a read result and a preset mapping table;

acquire an initial time stamp of a memory block of the memory blocks when the memory system is powered on again after being powered off, wherein the initial time stamp indicates an initial equivalent retention duration of the memory block prior to being powered off, and the initial equivalent retention duration is determined based on a temperature and an initial physical retention duration;

update a time stamp of the memory block according to the initial time stamp of the memory and the equivalent power-off duration; and determine, according to the updated time stamp of the memory block, a read voltage for performing a read operation on the memory block, wherein the updated time stamp is to indicate a sum of the initial equivalent retention duration of the memory block prior to being powered off and the equivalent power-off duration.

13. The memory system of claim 12, wherein the controller is configured to write the dummy data to the selected memory block using a multi-level-cell mode, wherein a memory cell having the written dummy data is configured to store one of memory states, the memory states corresponding to a set of read voltages, and read voltages in the set of read voltages differentiate different memory states.

14. The memory system of claim 12, wherein the controller is configured to write the dummy data to the selected memory block using a single-level-cell mode, wherein a memory cell having the written dummy data is configured to store either of two memory states, the two memory states corresponding to one read voltage, and the one read voltage differentiating different memory states.

15. The memory system of claim 13, wherein the preset mapping table includes a first preset mapping table, the first preset mapping table includes a mapping relationship between a preset number range and an equivalent retention duration, and the equivalent retention duration is determined based on the temperature and a physical retention duration, and wherein the controller is configured to:

perform a read operation on the dummy data in the selected memory block based on a read voltage; and determine the equivalent power-off duration of the memory system according to the read result and the first preset mapping table, wherein the read result includes a first count of memory cells each having a threshold voltage greater than or equal to the read voltage and a second count of memory cells each having a threshold voltage less than the read voltage, and the equivalent retention duration for the dummy data equals the equivalent power-off duration.

16. The memory system of claim 15, wherein the controller is further configured to:

read reference samples to determine read results of the reference samples in case of different equivalent retention durations;

determine the preset number range in case of a same equivalent retention duration according to the read results of the reference samples; and determine the mapping relationship between the preset number range and the equivalent retention duration as the first preset mapping table.

17. A non-transitory computer readable storage medium storing a computer program which, when executed, implements a method of operating a memory system, wherein the memory system includes a memory including memory blocks, and a controller coupled to the memory, and the method includes:

writing, after an external power-off and prior to the memory system being powered off, dummy data to a selected memory block;

reading, when the memory system is powered on again after being powered off, the dummy data from the selected memory block;

determining an equivalent power-off duration of the memory system according to a read result and a preset mapping table;

acquiring an initial time stamp of a memory block of the memory blocks when the memory system is powered on again after being powered off, wherein the initial time stamp indicates an initial equivalent retention duration of the memory block prior to being powered off, and the initial equivalent retention duration is determined based on a temperature and an initial physical retention duration;

updating a time stamp of the memory block according to the initial time stamp of the memory and the equivalent power-off duration; and determining, according to the updated time stamp of the memory block, a read voltage for performing a read operation on the memory block, wherein the updated time stamp is to indicate a sum of the initial equivalent retention duration of the memory block prior to being powered off and the equivalent power-off duration.

18. The non-transitory computer readable storage medium of claim 17, wherein writing the dummy data to the selected memory block includes writing the dummy data to the selected memory block using a multi-level-cell mode, wherein a memory cell having the written dummy data is configured to store one of memory states, the memory states corresponding to a set of read voltages, and read voltages in the set of read voltages differentiate different memory states.

19. The non-transitory computer readable storage medium of claim 18, wherein the preset mapping table includes a first preset mapping table, the first preset mapping table includes a mapping relationship between a preset number range and an equivalent retention duration, and the equivalent retention duration is determined based on the temperature and a physical retention duration, and wherein the method further includes:

performing a read operation on the dummy data in the selected memory block based on a read voltage; and determining the equivalent power-off duration of the memory system according to the read result and the first preset mapping table, wherein the read result includes a first count of memory cells each having a threshold voltage greater than or equal to the read voltage and a second count of memory cells each having a threshold voltage less than the read voltage, and the equivalent retention duration for the dummy data equals the equivalent power-off duration.

20. The non-transitory computer readable storage medium of claim 17, wherein writing the dummy data to the selected memory block includes writing the dummy data to the selected memory block using a single-level-cell mode, wherein a memory cell having the written dummy data is configured to store either of two memory states, the two memory states corresponding to one read voltage, and the one read voltage differentiating different memory states.

* * * * *